(12) United States Patent
Yamamura et al.

(10) Patent No.: US 7,874,606 B2
(45) Date of Patent: Jan. 25, 2011

(54) UTILITY VEHICLE

(75) Inventors: Takashi Yamamura, Shizuoka (JP); Craig Smith, Newnan, GA (US)

(73) Assignees: Yamaha Hatsudoki Kabushiki Kaisha, Shizuoka (JP); Yamaha Motor Manufacturing Corporation of America, Newnan, GA (US)

( * ) Notice: Subject to any disclaimer, the term of this patent is extended or adjusted under 35 U.S.C. 154(b) by 0 days.

(21) Appl. No.: 12/361,611

(22) Filed: Jan. 29, 2009

(65) Prior Publication Data

US 2009/0184531 A1   Jul. 23, 2009

Related U.S. Application Data

(63) Continuation-in-part of application No. 12/017,865, filed on Jan. 22, 2008, now Pat. No. 7,735,889.

(51) Int. Cl.
*B60N 2/36* (2006.01)

(52) U.S. Cl. .................. 296/64; 296/65.05; 296/69; 296/66; 296/182.1

(58) Field of Classification Search .............. 296/24.34, 296/24.4, 193.07, 204, 63, 65.01, 65.13, 296/182.1, 183.1, 184.1, 186.1, 37.1, 37.6, 296/37.16, 69, 66, 65.05, 65.09, 65.16; 297/217.7
See application file for complete search history.

(56) References Cited

U.S. PATENT DOCUMENTS

| | | | | |
|---|---|---|---|---|
| 5,301,997 A | * | 4/1994 | Cudden | .................. 296/182.1 |
| 6,481,772 B1 | * | 11/2002 | Tenn | ........................ 296/26.11 |
| D483,695 S | * | 12/2003 | Bellington | .................... D12/16 |
| 6,899,378 B2 | * | 5/2005 | Rhodes et al. | ........... 296/183.1 |
| 6,905,159 B1 | * | 6/2005 | Saito et al. | ............... 296/65.01 |
| 6,994,388 B2 | | 2/2006 | Saito | |
| 7,028,872 B2 | * | 4/2006 | Lobanoff | ..................... 224/497 |
| 7,240,948 B1 | * | 7/2007 | Houston | ...................... 296/63 |
| 7,416,238 B2 | * | 8/2008 | Houston | ...................... 296/66 |
| 2004/0195034 A1 | * | 10/2004 | Kato et al. | .................. 180/312 |
| 2008/0122240 A1 | * | 5/2008 | Leroy et al. | ................. 296/37.6 |
| 2008/0265604 A1 | * | 10/2008 | Houston | .................... 296/37.6 |
| 2008/0289896 A1 | * | 11/2008 | Kosuge et al. | ............. 180/312 |
| 2009/0256388 A1 | * | 10/2009 | Tanaka et al. | ............ 296/186.4 |

* cited by examiner

*Primary Examiner*—Patricia L Engle
(74) *Attorney, Agent, or Firm*—Keating & Bennett, LLP

(57) ABSTRACT

A utility vehicle includes a vehicle body frame, a pair of left and right front wheels and at least a pair of left and right rear wheels that are supported on the vehicle frame, a front seat that is provided to the rear of the front wheels, and a rear seat that is provided to the rear of the front seat and including an in-use position, a transition position, and a non-use position. A cargo bed, disposed to the rear of the front seat includes a bottom wall portion whereon the seat cushion portion of the rear seat is provided movably; a left side wall portion and a right side wall portion that are provided on the left and right side portions of the bottom wall portion, wherein the left side wall portion and the right side wall portion extend forward to the rear seat in its non-use position; and a rear wall portion that is provided at the rear end portion of the bottom wall portion. The utility vehicle further includes a rear floor provided between the front seat and the rear seat and lower than the bottom wall portion of the cargo bed.

15 Claims, 20 Drawing Sheets

UTILITY VEHICLE

This is a continuation-in-part application of Ser. No. 12/017,865 filed on Jan. 22, 2008 now U.S. Pat. No. 7,735,889.

FIELD OF THE INVENTION

The present invention relates to an improved design of a utility vehicle with an expandable cargo bed.

BACKGROUND OF THE INVENTION

In this type of utility vehicle, in some cases there is the need to not only have a front seat and a rear seat, which is disposed behind the front seat, but also secure luggage or cargo space. For example, a conventional vehicle able to fulfill these needs is disclosed in U.S. Pat. No. 6,994,388. In conventional utility vehicles a cargo bed is structured from a bottom wall, left and right side walls, a back wall, and an extension wall that either can rotate towards the front portion of the left/right side walls, or that can slide in the front/back direction of the vehicle.

Additionally, in conventional utility vehicles in order for the cargo space to be extended, the rear seat must be folded down and the extension wall is either rotated to the front, or slid to the front, to extend the left/right side walls in the forward direction.

In conventional utility vehicles the structure of the cargo bed is complicated due to the need for the extension wall, and the process of expanding the cargo space is laborious.

SUMMARY OF THE INVENTION

What is needed therefore is a utility vehicle wherein the cargo bed is simple and wherein the cargo space can be expanded easily, without having an impact on the ease of ingress/egress of the rear seat passengers.

In accordance with exemplary embodiments of the invention an improved utility vehicle is provided where the side wall portions of the cargo bed are extended towards the outsides of the rear seat. Additionally, by extending the side wall portions of the cargo bed forward in order to expand the cargo bed space not only simplifies the structure, but eliminates the work involved in the operations of expanding the cargo bed space.

In an exemplary embodiment of the present invention a utility vehicle including: a vehicle body frame; a pair of left and right front wheels and at least a pair of left and right rear wheels that are supported on the vehicle frame; a front seat that is provided to the rear of the front wheels; a rear seat that is provided to the rear of the front seat having an in-use position, a transition position, and a non-use position; a cargo bed, disposed to the rear of the front seat including: a bottom wall portion whereon the seat cushion portion of the rear seat is provided movably; a left side wall portion and a right side wall portion that are provided on the left and right side portions of the bottom wall portion, wherein the left side wall portion and the right side wall portion extend forward to the rear seat in its non-use position; and a rear wall portion that is provided at the rear end portion of the bottom wall portion; and a rear floor provided between the front seat and the rear seat and lower than the bottom wall portion of the cargo bed.

In the utility vehicle in accordance with an exemplary embodiment of the present invention, the seat cushion portion of the rear seat is provided movably on the bottom wall portion of the cargo bed, and the left and right side wall portions of the cargo bed a extend forward to the left and right rear roof supports, respectively, thus enabling the cargo bed space to be expanded and making the structure and operation of expanding the cargo space extremely simple, completed by merely moving the rear seat.

DETAILED DESCRIPTION OF THE INVENTION

Figure 1:
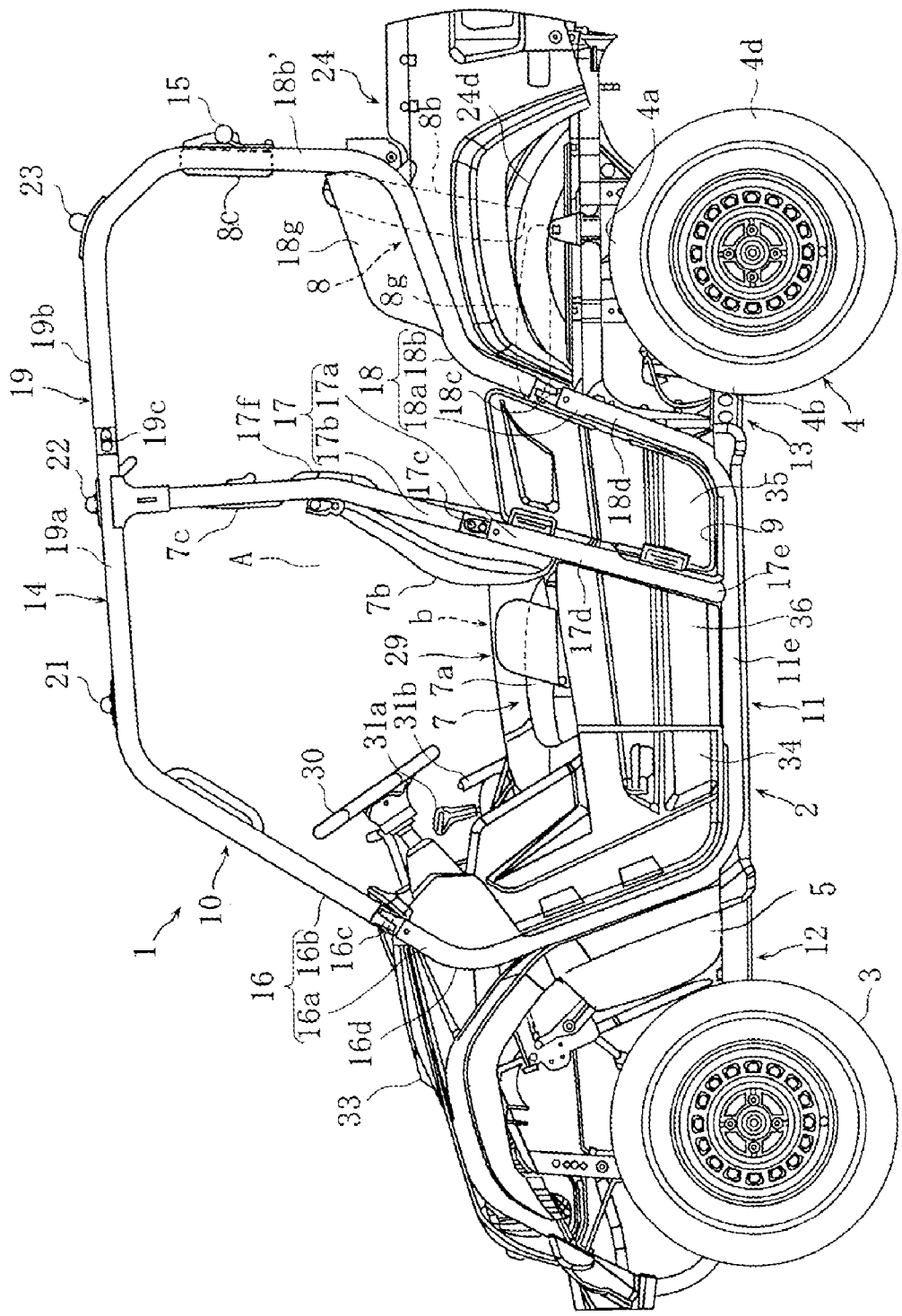
FIG. 1 is a left side view of an all-terrain vehicle as set forth in one example of embodiment according to the present invention.
Figure 2:
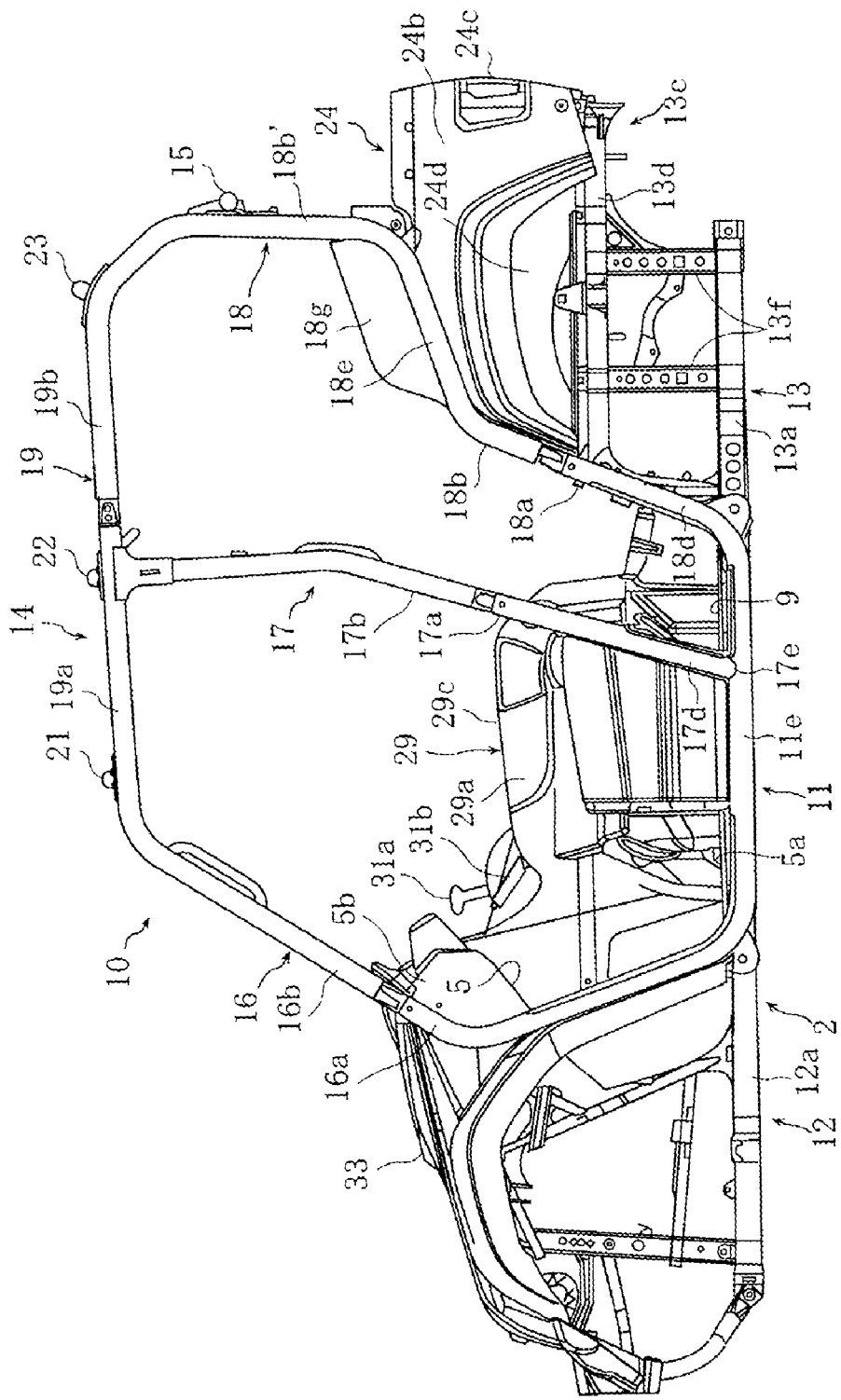
FIG. 2 is a left side view of the state wherein the wheels, seats, door, etc., have been removed from the vehicle.

Exemplary embodiments of the present invention will be explained below in reference to the appended Figures.

FIGS. 1 through 22 are for explaining and all-terrain vehicle as set forth in one example of embodiment according to the present invention. Note that in the present specification, "front," "forward," "back," "behind," "rear," "left," and "right" refer to "front," "forward," "back," "behind," "rear," "left," and "right" refer to the perspective of a passenger seated in a seat, unless otherwise noted.

Referring now to the figures generally, a utility vehicle 1 is provided that includes: a vehicle body frame 2; a pair of left and right front wheels 3 that are supported on the left and right side portions at the forward portion of the vehicle body frame 2; a pair of left and right rear wheels 4 that are supported on the left and right side portions of the rear portion; a front panel 5 that is disposed to the rear of the front wheels 3 of the vehicle body frame 2, in the front/back direction of the vehicle; and an engine unit 6 that is disposed to the rear, in the front/back direction of the front panel 5 of the vehicle body frame 2.

Additionally, the utility vehicle 1 includes: a front seat 7 that is disposed to the rear, in the front/back direction of the utility vehicle 1, of the front panel 5 of the vehicle body frame 2; a rear seat 8 that is disposed to the rear, in the front/back direction of the utility vehicle 1, of the front seat 7; a rear floor 9 that is disposed at a position that is lower than a top end 4a of the rear wheel 4, between, in the front/back direction of the utility vehicle 1, the front seat 7 and the rear seat 8; a cargo bed 24 that is provided to the rear of the front seat 7, in the front/back direction of the utility vehicle 1; and a cabin structuring member 10, attached to the vehicle body frame 2, structured from left and right side portions and a ceiling portion of the cabin A.

The engine unit 6 has a structure that can be summarized as a cylinder body 6b, a cylinder head 6c, and a head cover 6d being joined together facing upward at the rear diagonal of the vehicle on the rear portion of the top surface of a crankcase 6a. A transmission case 6j is provided on the left side portion of the crankcase 6a that houses a V-belt-type continuously variable transmission.

Additionally, the throttle body 6e is connected to the front wall, in the front/back direction of the vehicle, of the cylinder head 6c, and a vacuum pipe 6f is connected to the throttle body 6e. This vacuum pipe 6f is formed to the rear of the front panel 5, and extends to the space B that is formed by a hood 33. An air cleaner 6h is attached to the upstream end of the vacuum pipe 6f, with a surge tank 6g provided therebetween. An exhaust pipe 6i is connected to the rear wall of the cylinder head 6c.

Figure 6:
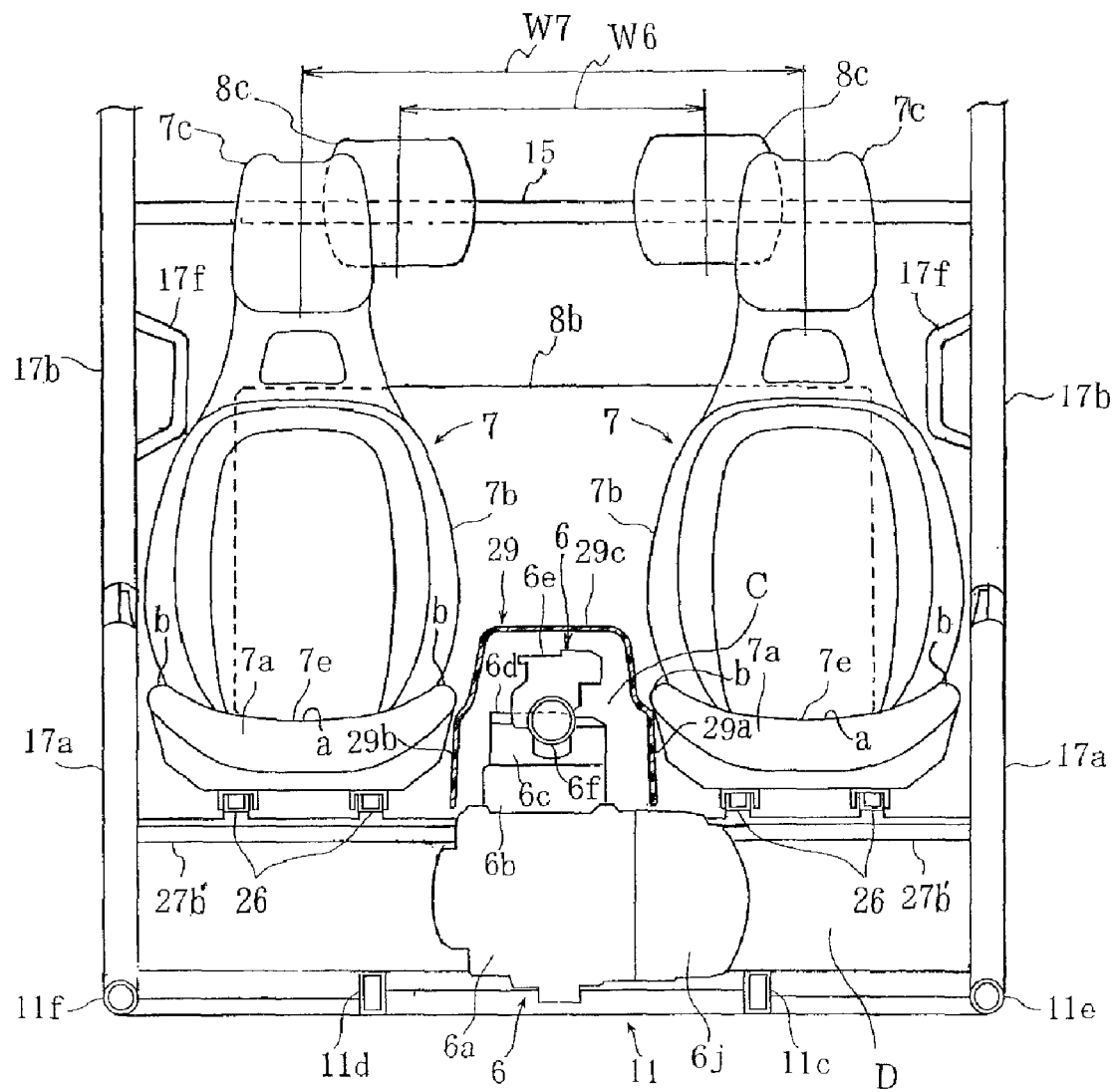
FIG. 6 is a cross-sectional diagram along the section VI-VI in FIG. 3, illustrating the relationships between the front seat, the center console, and the engine.
Figure 7:
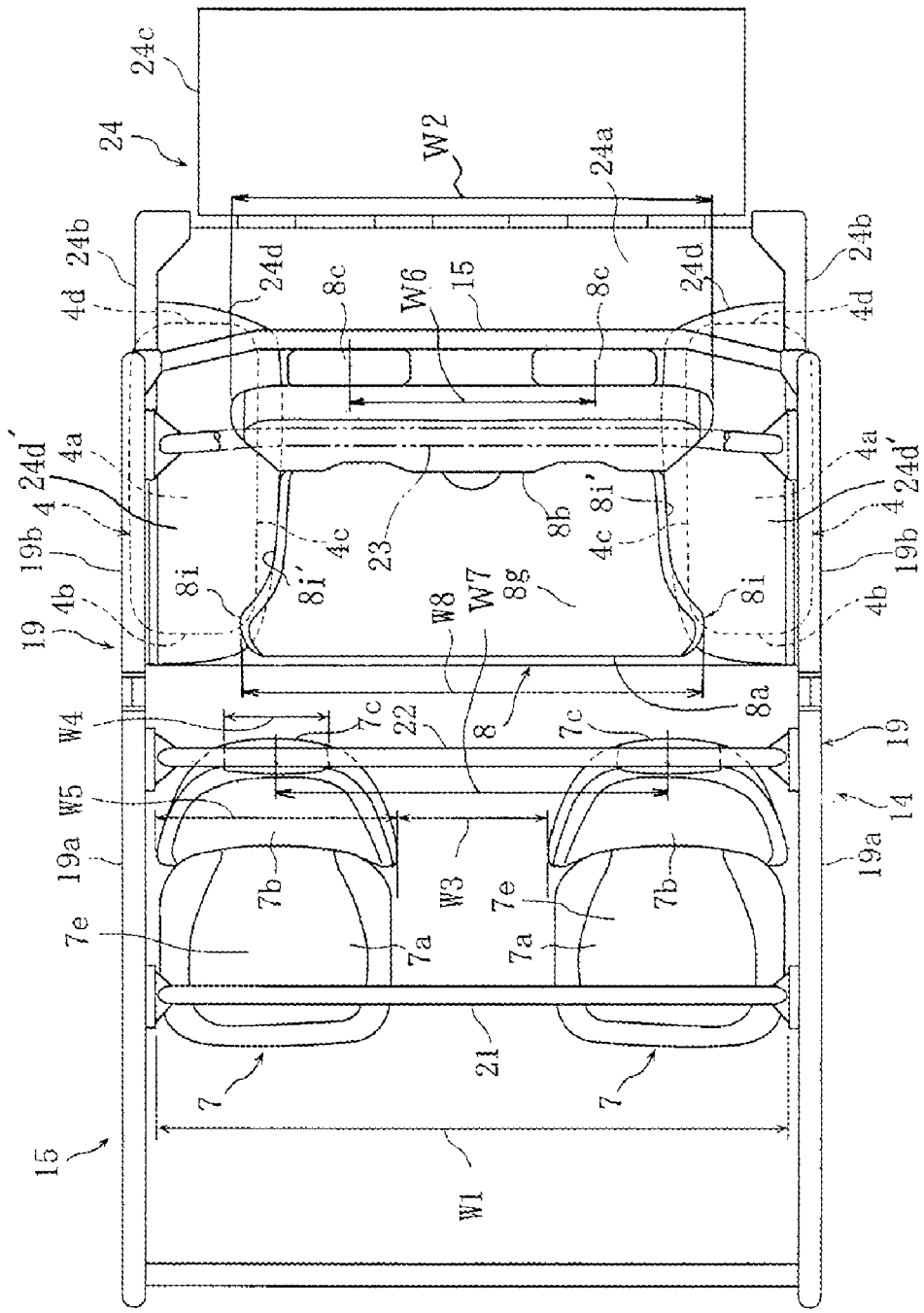
FIG. 7 is a plan view illustrating the relationships between the front seats and the rear seat.
Figure 8:
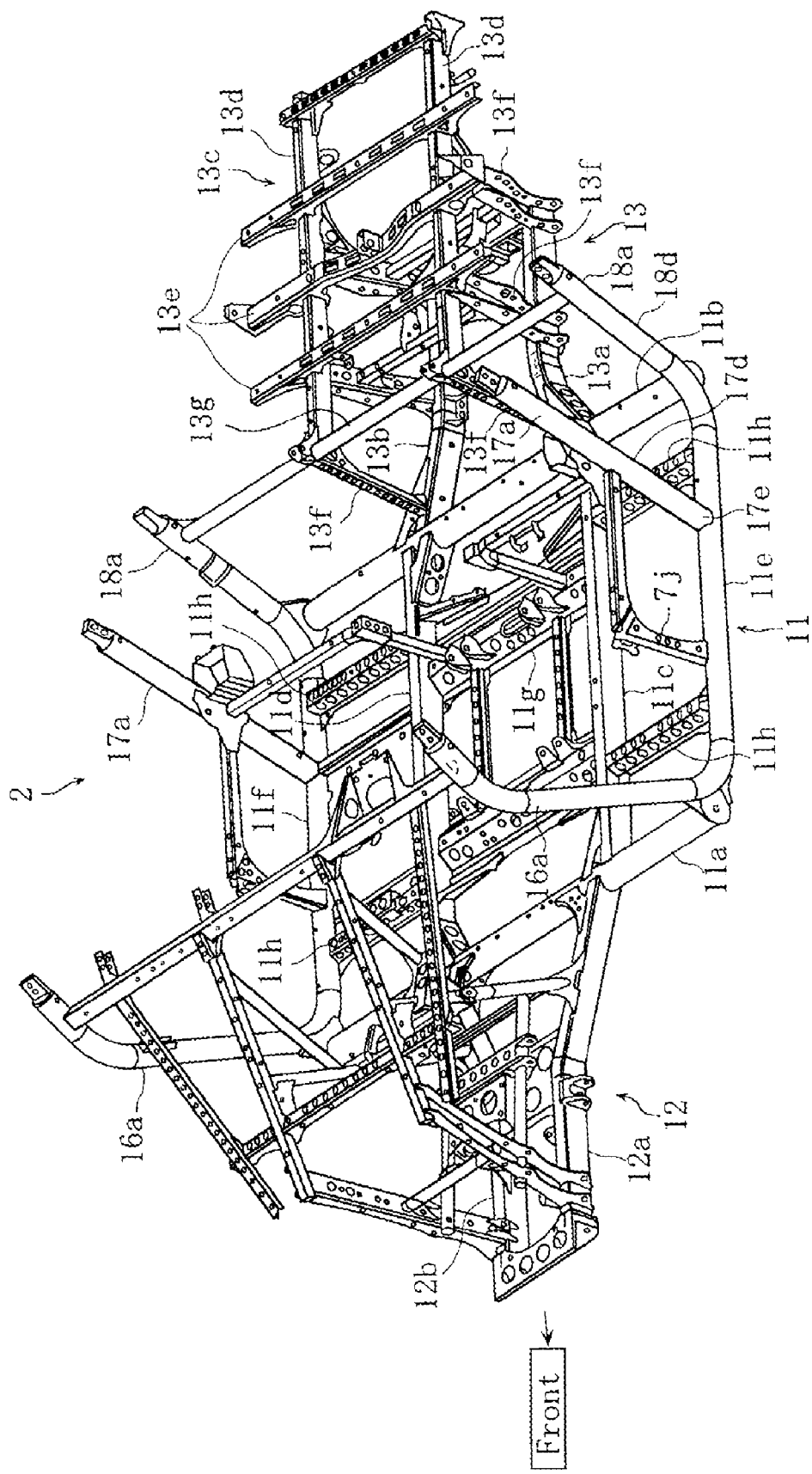
FIG. 8 is an oblique view illustrating the vehicle body frame and the lower portions of the roof supports.
Figure 9:
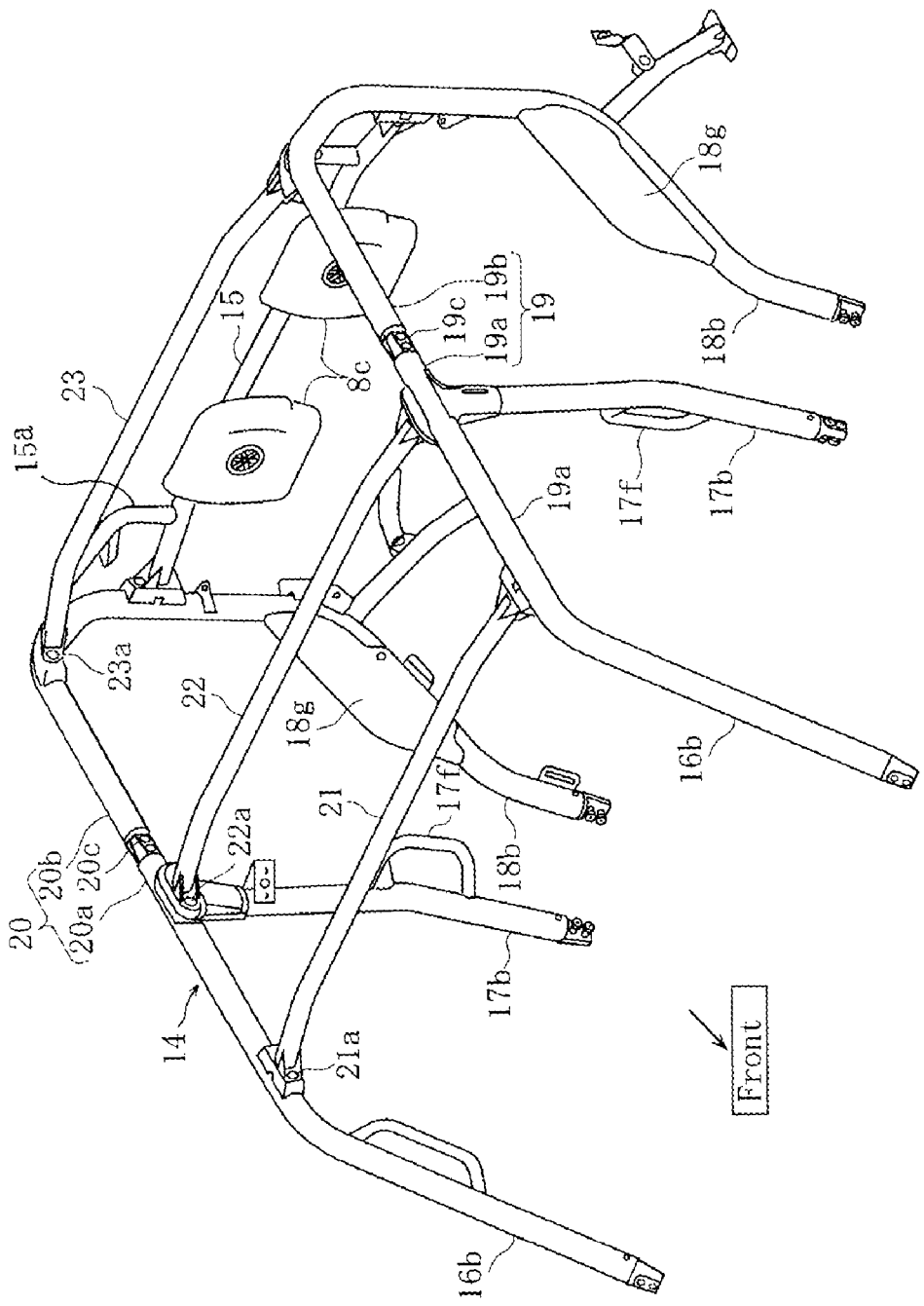
FIG. 9 is an oblique view illustrating the top portions of the roof supports and the roof member.
Figure 10:
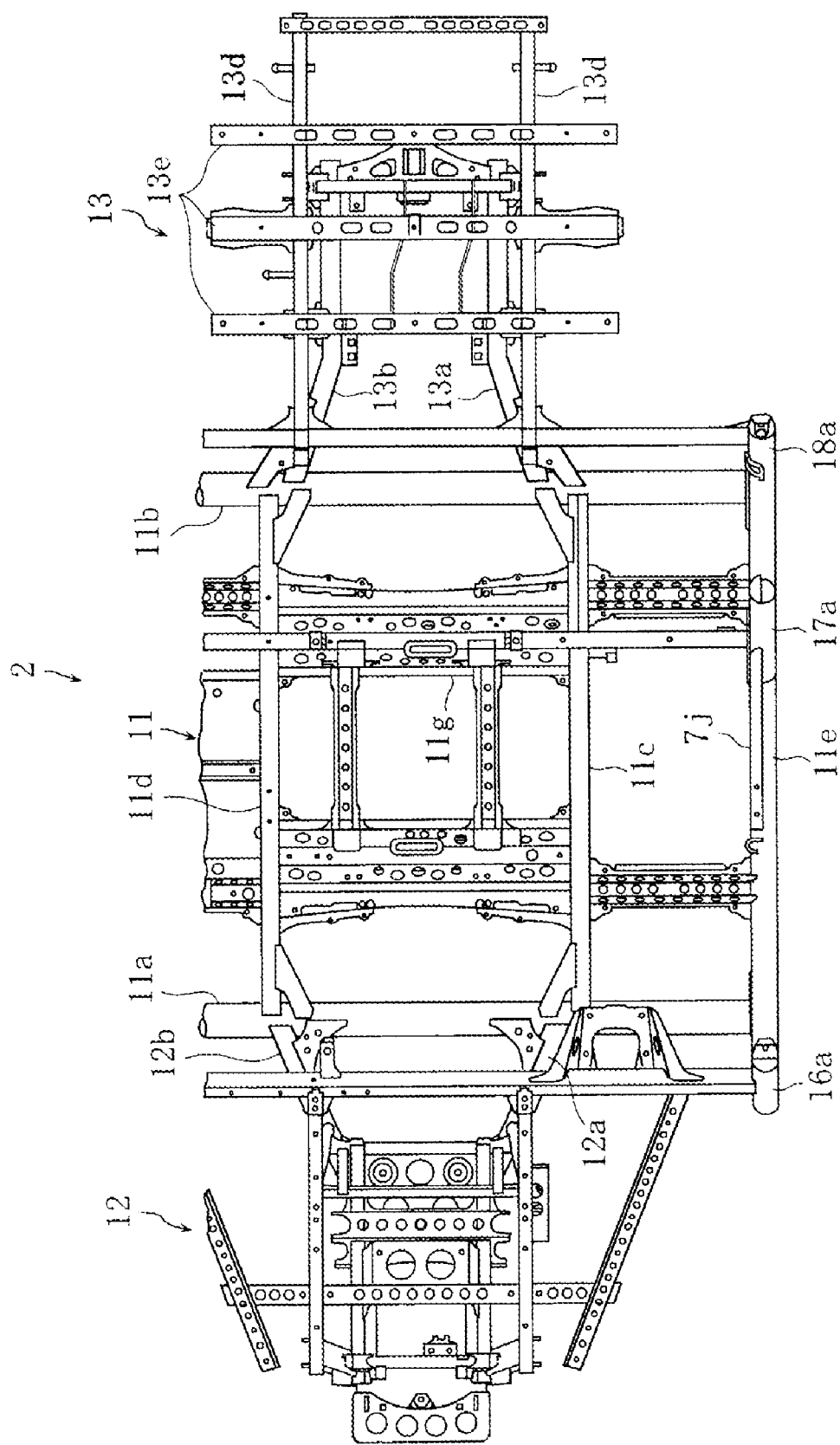
FIG. 10 is a plan view of a vehicle frame and a roof support lower portion.
Figure 11:
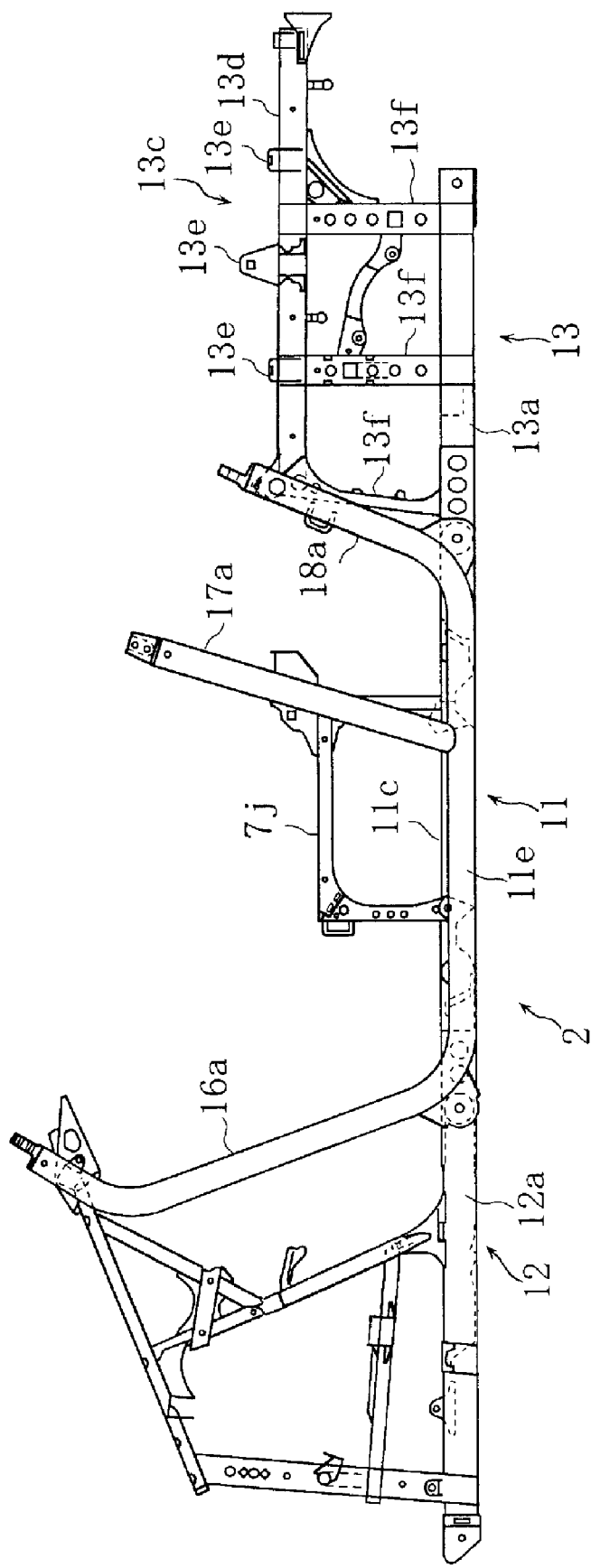
FIG. 11 is a left side view of a vehicle frame and a roof support lower portion.
Figure 12:
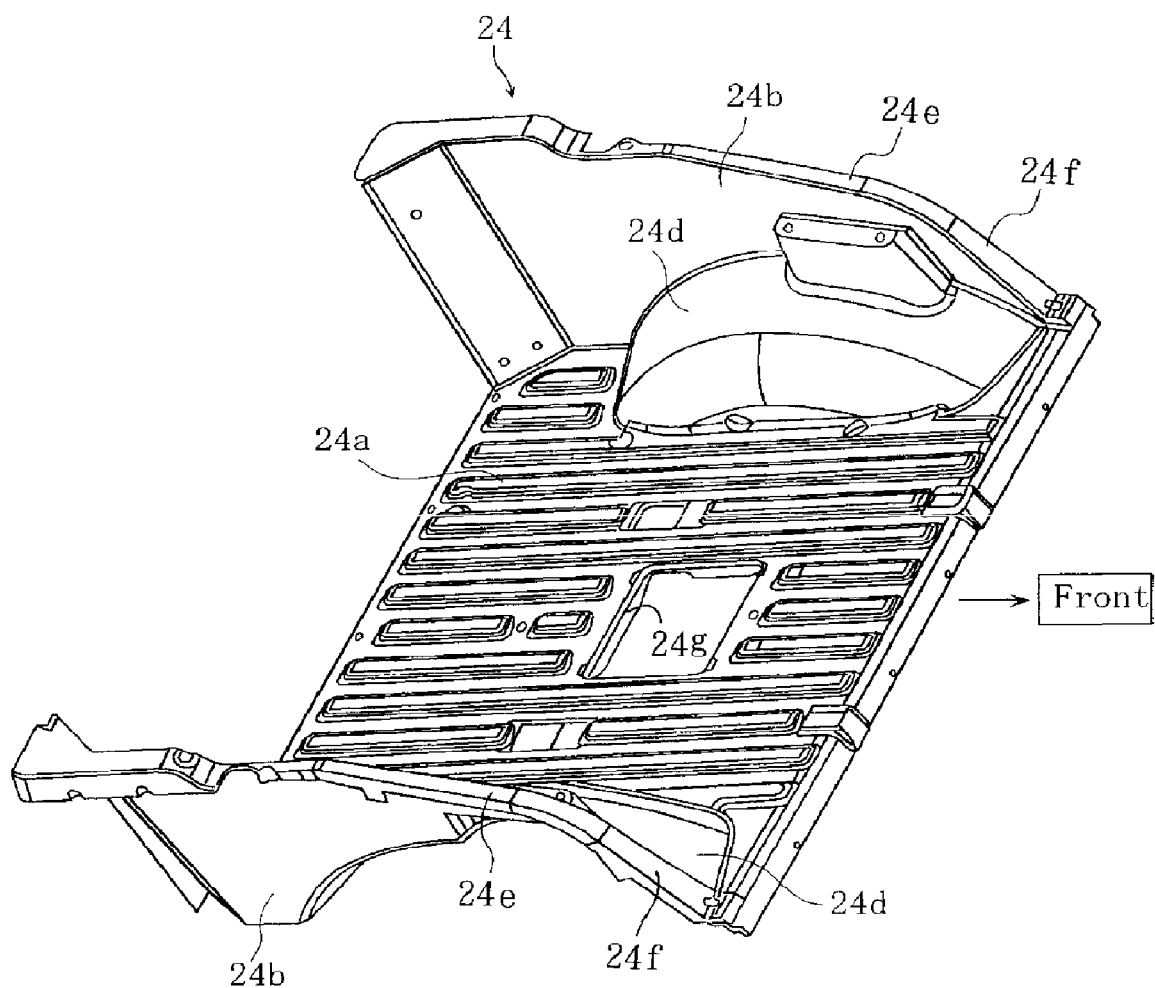
FIG. 12 is an oblique view of a cargo bed.
Figure 13:
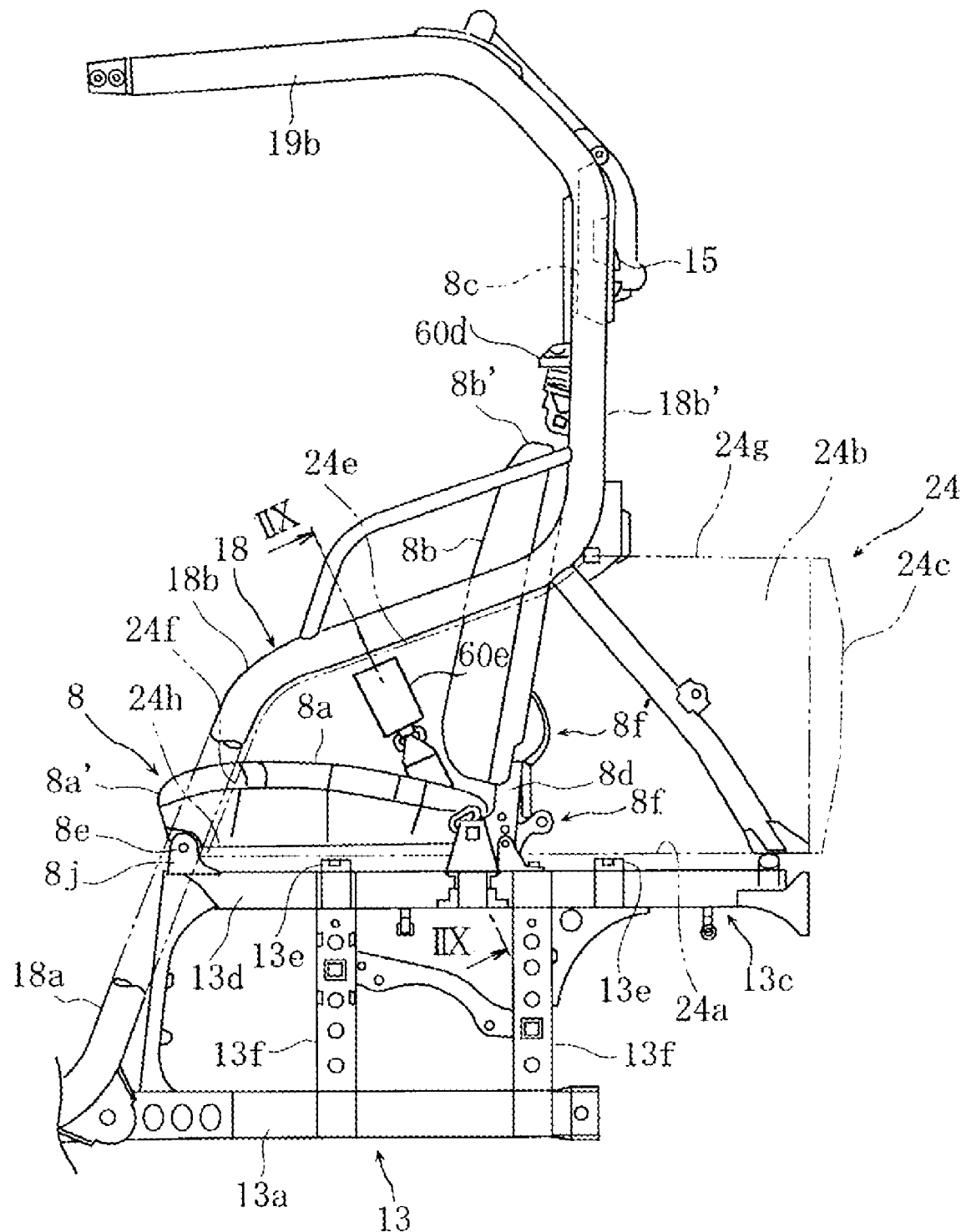
FIG. 13 is a left side view of the rear seat in the attached state.
Figure 14:
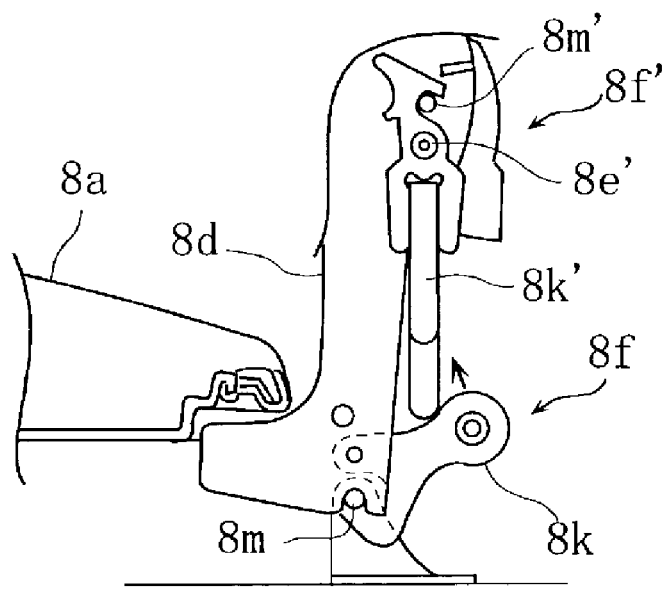
FIG. 14 is a left side view illustrating a rear seat lock mechanism.

The engine unit 6 is disposed in an interior space C of the center console 29. The center console 29 comprises a left side wall 29a, a right side wall 29b, and a top wall 29c, and extends in the rearward direction from the center portion, in the direction of width of the utility vehicle 1, of the front panel 5 to the rear of the rear end portion 7g of a seat cushion portion 7a of the front seat 7. Furthermore, as illustrated in FIG. 6, the upper portion above the transmission case 6j of the engine unit 6 is covered from above and from the left and right sides by a top wall 29c and by left and right side walls 29a and 29b of the center console 29.

Figure 5:
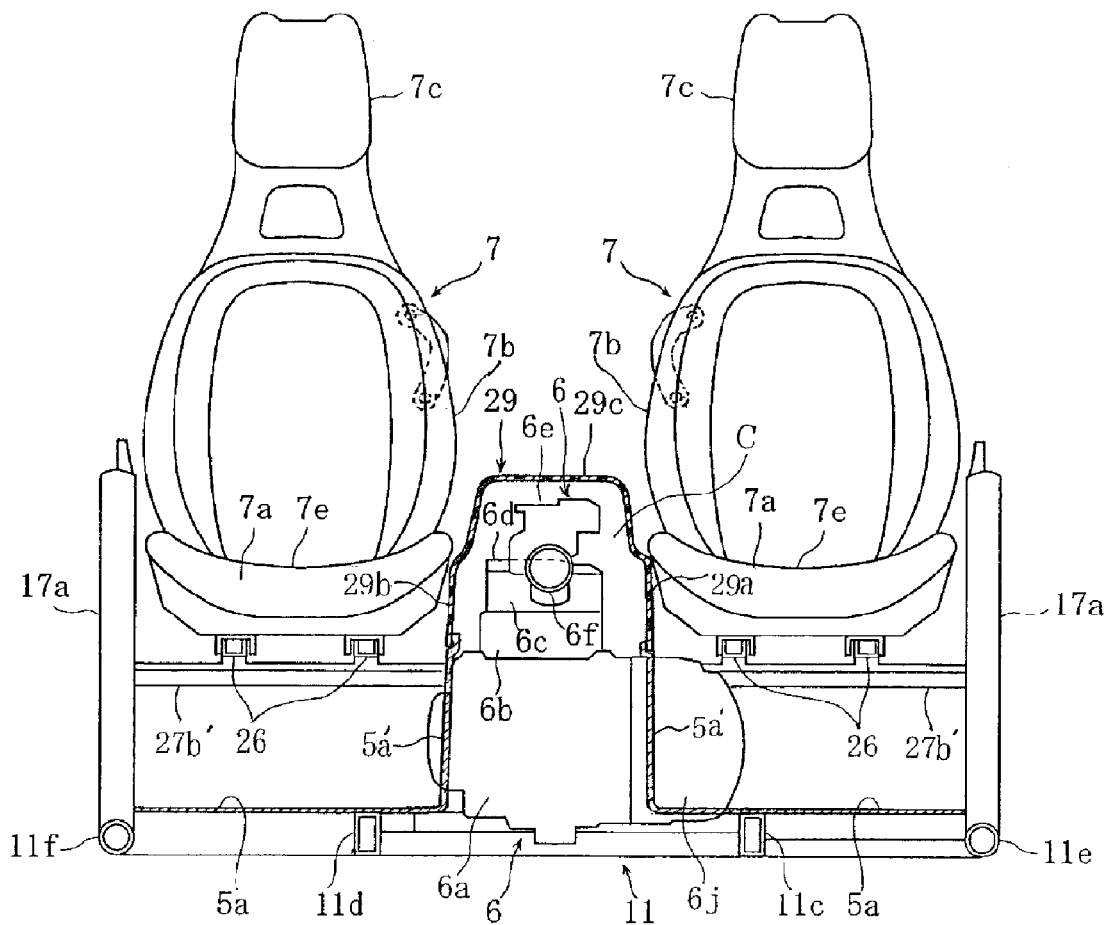
FIG. 5 is a cross-sectional diagram along the section V-V in FIG. 3, illustrating the relationship between the front seat, the center console, and the engine.

Additionally, as illustrated in FIG. 5, the portions of the left and right side walls 29a and 29b of the center console 29 that are further forward from the front seat 7 are connected to extension portions 5a' of the front floor 5a. These extension portions 5a' form a portion of the left and right side walls of the center console 29.

Furthermore, the top wall 29c of the center console 29 is positioned at a position that is higher than the center portion, in the direction of width of the vehicle, of the seating surface 7e of the seat cushion portion 7a of the front seat 7, and positioned at a position that is lower than the top end 5b of the front panel 5. The interior space C of the center console 29 communicates with the space B that is covered by a hood 33, so as to be able to open and close, forward of the front panel 5. Furthermore, the interior space C of the center console 29 communicates with the space D below the left and right front seats 7.

The throttle body 6e is connected to the engine unit 6, and the vacuum pipe 6f, and the surge tank 6g are disposed within this interior space C, and the air cleaner 6h is disposed within the interior space B. The utility vehicle also includes a steering wheel 30, a lever 31a for changing the transmission between a high and a low gear, and a parking brake lever 31b.

The vehicle body frame 2 includes: a center frame 11 that structures the lower portion of the cabin A; a front frame 12, connected to the front end of the center frame 11, for structuring the front portion of the utility vehicle 1; and a rear frame 13, connected to the rear end of the center frame 11, for structuring the rear portion of the utility vehicle 1. The center frame 11 is essentially rectangular in the plan view, and includes: front and rear cross pipes 11a and 11b that are made from pipes that extend in the direction of width of the vehicle; left and right center main pipes 11c and 11d, made out of pipes, connecting at the center portion in the direction of width of the utility vehicle; and left and right side pipes 11e and 11f, made out of pipes, connecting at the outside end portions in the direction of width of the utility vehicle.

An engine bracket 11g, for mounting the engine unit 6, is provided between the left and right center main pipes 11c and 11d. Moreover, a floor bracket 11h, for supporting a front floor 5a and connecting to the center panel 5 extending in the rearward direction, may be provided between the left and right center main pipes 11c and 11d and the left and right side pipes 11e and 11f.

The front frame 12 includes left and right front main pipes 12a and 12b that extend rearward from the portion wherein the left and right center main pipes 11c and 11d of the cross pipe 11a are connected. These left and right front main pipes 12a and 12b extend angled towards the inside from the connecting portion, and then extend rearward in parallel with the center line of the vehicle. Front wheels 3 are supported, via front arms, on this portion that extends in parallel, so as to be able to sway freely.

The rear frame 13 has left and right rear main pipes 13a and 13b that extend to the rear from the portion wherein the left and right center main pipes 11c and 11d of the rear cross pipe 11b are connected, and a cargo bed frame 13c that is disposed above the rear main pipes 13a and 13b. The left and right rear main pipes 13a and 13b extend angled towards the inside towards the back from the connecting portion, and then extend further towards the rear in parallel with the center line of the vehicle. The rear wheels 4 are supported, via a rear arm, on the portion that extends rearward, so as to be able to sway freely up and down.

Additionally, the cargo bed frame 13c is formed through the connection of the rear main pipes 13a and 13b, left and right lengthwise frames 13d and 13d that extend in parallel, when viewed from the side of the vehicle, and a plurality of cross frames 13e that extend in the direction of width of the vehicle. Given this, the cargo bed frame 13c is secured, so as to be positioned above the rear main pipes 13a and 13b, through a plurality of leg members 13f.

Additionally, a cargo bed 24 is positioned on the cargo bed frame 13c. This cargo bed 24 comprises a bottom wall portion 24a that is placed on top of the cargo bed frame 13c, left and right side wall portions 24b and 24b that are formed integrally so as to rise upwards from the left and right side edge portions of the bottom wall portion 24a, and a door 24c that structures the back wall, and is open in the forward and upward directions.

The top edges 24e and the front edges 24f of the front portion, in the front/back direction of the vehicle, of the left and right side wall portions 24b are formed so as to follow along the shape of the rear roof supports 18, described below, and, specifically, formed at positions that are lower the further forward. Additionally, the top edges 24g of the rear portion of the left and right side wall portions 24b are formed at positions that are higher the further forward, and are formed at positions that are lower than the top edges 8b' of the backrest portion 8b of the rear seat 8. Furthermore, the front ends 24h of the left and right side wall portions 24b are positioned forward, into the front/back direction of the vehicle, from the front end 8a' of the seat cushion portion 8a of the rear seat 8.

Additionally, tire housings 24d are formed at the corner portions between the bottom wall portion 24a and the left and right side wall portions 24b. These tire housings 24d are shaped bulging upward above the bottom wall portion 24a and towards the inside, in the direction of width of the vehicle, of the left and right side wall portions 24b. The provision of the tire housings 24d secures a large vertical stroke of the rear wheels 4, without increasing the height of the vehicle.

Additionally, at essentially the center portion of the bottom wall portion 24a, an indented portion 24g is formed so as to be able to house a buckle 60e of a rear seatbelt device 60, described below.

The front seat 7 is a bucket type seat wherein the left and the right are separate, and the seat cushion and backrest are structured as a single unit. The left and right front seats 7 each have their respective seat cushion portions 7a, backrest portions 7b that rise up in the upward direction from the rear end portions of the seat cushion portions 7a, and headrest portions 7c that are formed integrally at the upper end portion of the backrest portions 7b. The seat cushion portions 7a are mounted on seat rails 7d so as to be able to slide forward and backward. The seat rails 7d are secured to the center frame 11 through seat brackets 7j.

The rear seat 8 is of a bench type seat and includes: a single seat cushion portion 8a that extends in the direction of width of the vehicle so as to be able to seat both a left and a right passenger; a single backrest portion 8b that, similarly, extends in the direction of width of the vehicle so as to be able to support the backs of both the left and the right passengers; and headrest portions 8c and 8c, which are formed independently on the left and the right. The backrest portion 8b is disposed so as to be coincident, from above, with the rear end portion of the seat cushion portion 8a, and is attached so as to be able to rotate forward via a bracket 8d at the rear end portion thereof.

The seat cushion portion 8a of the rear seat 8, is disposed at a position that, when viewed from above, is between the left and right tire housings 24d. More precisely, the left and right outer end portions 8i' of the seat cushion portion 8a are positioned towards the inside, in the direction of width of the vehicle, from the interior end portions 4c of the tire housings 24d, and, by extension, from the rear wheels 4. On the other hand, the left and right end portions 8i, which are disposed on the front end and the left and right ends of the seat cushion portion 8a, are disposed so as to be coincident with the front end portions of the tire housings 24d. Here the tire housings 24d are formed angled downward towards the front so as to be lower the further forward, so that the left and right end portions 8i can secure an adequate cushion width, without being higher than the other portions, even when the left and right end portions 8i are disposed over the front end portions of the tire housings 24d. The headrest portions 8c may be separate from the backrest portion 8b in the upward direction. The headrest portions 8c may be attached to a rear cross pipe 15, as further described below.

The front portion of the bottom surface of the seat cushion portion 8a is supported so as to be able to rotate to the front or to the rear by a rotating shaft 8e at the front end portion of the cargo bed frame 13c. The rear end portion of the seat cushion portion 8a is provided with a rear seat lock member 8f that locks to the rear seat 8 to, and unlocks the rear seat 8 from, the cargo bed frame 13c.

The width dimension W2, in the direction of width of the utility vehicle, of the outside ends of both the left and the right of the backrest portion 8b of the rear seat 8 is set so as to be smaller than the width dimension W1, in the direction of width of the vehicle, of the left and right front seats 7. Additionally, the headrest portion 8c of the rear seats 8 are disposed so that the gap W6, in the direction of width of the vehicle, is narrower than the gap W7, in the direction of width of the vehicle, of the headrest portions 7c of the front seat 7, and are thus disposed further towards the interior, in the direction of width of the vehicle.

Additionally, the width dimension W8, in the direction of width of the utility vehicle, of the seating surface 8g upon which the passenger is seated, in the rear seat 8 is set to be smaller than the width dimension W1, in the direction of width of the vehicle, of the left and right front seats 7, and less than the width dimension W2, in the direction of width of the vehicle, of the backrest portion 8b of the rear seat 8. Additionally, the seating surface 8g is disposed in a position that is lower than the top ends 24d' of the tire housings 24d. Furthermore, the seating surface 8g in the present form of embodiment means the portion whereon the passenger can sit without obstruction. For example, it would be difficult to sit if the seating surface 8g were provided all the way to the top surfaces of the tire housings 24d. That is, the tire housings 24d are fabricated so as to be higher the further towards the outside, in the direction of width of the vehicle, so that merely extending the seating surface to the outside on the left and the right would cause it not to function as a seating surface because it would be difficult to sit upon the extended portion on the tire housing.

Because, in this way, the width dimension W8 of the seating surface 8g of the rear seat 8 is set so as to be narrower than the width dimension W1 of the front seat 7, the passenger in the rear seat 8 will sit in a position that is shifted towards the center of the vehicle from the passenger in the front seat 7. In addition, the front seats 7 are split into the left and the right, and a gap W3, wherein the engine unit 6 may be disposed, is opened therebetween. Because of this, the passenger seated in the rear seat 8 is able to secure an adequate field of view in the forward direction of the automobile between the left and right front seats 7.

Additionally, the left and right side wall portions 24b of the cargo bed 24 are disposed so as to be coincident, in the front/back direction of the vehicle, with a portion of the roof supports 18, described below, and the rear seat 8. More specifically, most of the seat cushion portion 8a and the bottom portion of the backrest portion 8b of the rear seat 8 are disposed towards the inside, in the direction of width of the vehicle, of the front portion of the left and right side wall portions 24b. Additionally, the middle portions 18e of the rear roof supports 18 are positioned below the top edges 24e of the front portion of the side wall portions 24b, and are formed so as to follow the shape of the top edges 24e.

The front seat cushion portion 8a and the backrest portion 8b of the rear seat 8 are structured so as to be able to be moved, and specifically, so as to be able to be folded, between an in-use position, wherein passengers sit over the cargo bed 24, and an not-in-use position wherein no passengers are seated at the forward direction of the cargo bed 24. Specifically, the front end portion of the bottom surface of the seat cushion portion 8a is supported so as to be able to rotate to the front by a rotary axle 8e, which extends in the direction of width of the vehicle, and a bracket 8j, at the front end portion of the cargo bed frame 13c.

Furthermore, the bracket 8d is affixed to the rear end portion of the seat cushion portion 8a, and the backrest portion 8b is supported, so as to be able to be rotated to the front by the rotary axle 8e' that extends in the direction of width of the vehicle, on the bracket 8d. Additionally, a cushion portion locking mechanism 8f, which can lock the seat cushion portion 8a to, and unlock the seat cushion portion 8a from, a cargo bed frame 13c, and a backrest portion locking mechanism 8f, for locking the backrest portion 8b in an erect state, are also provided. The cushion portion locking mechanism 8f is able to lock the seat cushion portion 8a to the cargo bed frame 13c or to enable a rotation towards the front, through a locking lever 8k, which is supported on the bracket 8d, engaging with/disengaging from a locking pin 8m that is attached to the cargo bed frame 13c.

The backrest portion locking mechanism 8f is able to lock the seat cushion portion 8b in the erect state or to enable a rotation towards the front, through a locking lever 8k', which is supported on the bracket 8d, engaging with/disengaging from a locking pin 8m' that is attached to the backrest portion 8a side.

Figure 3:
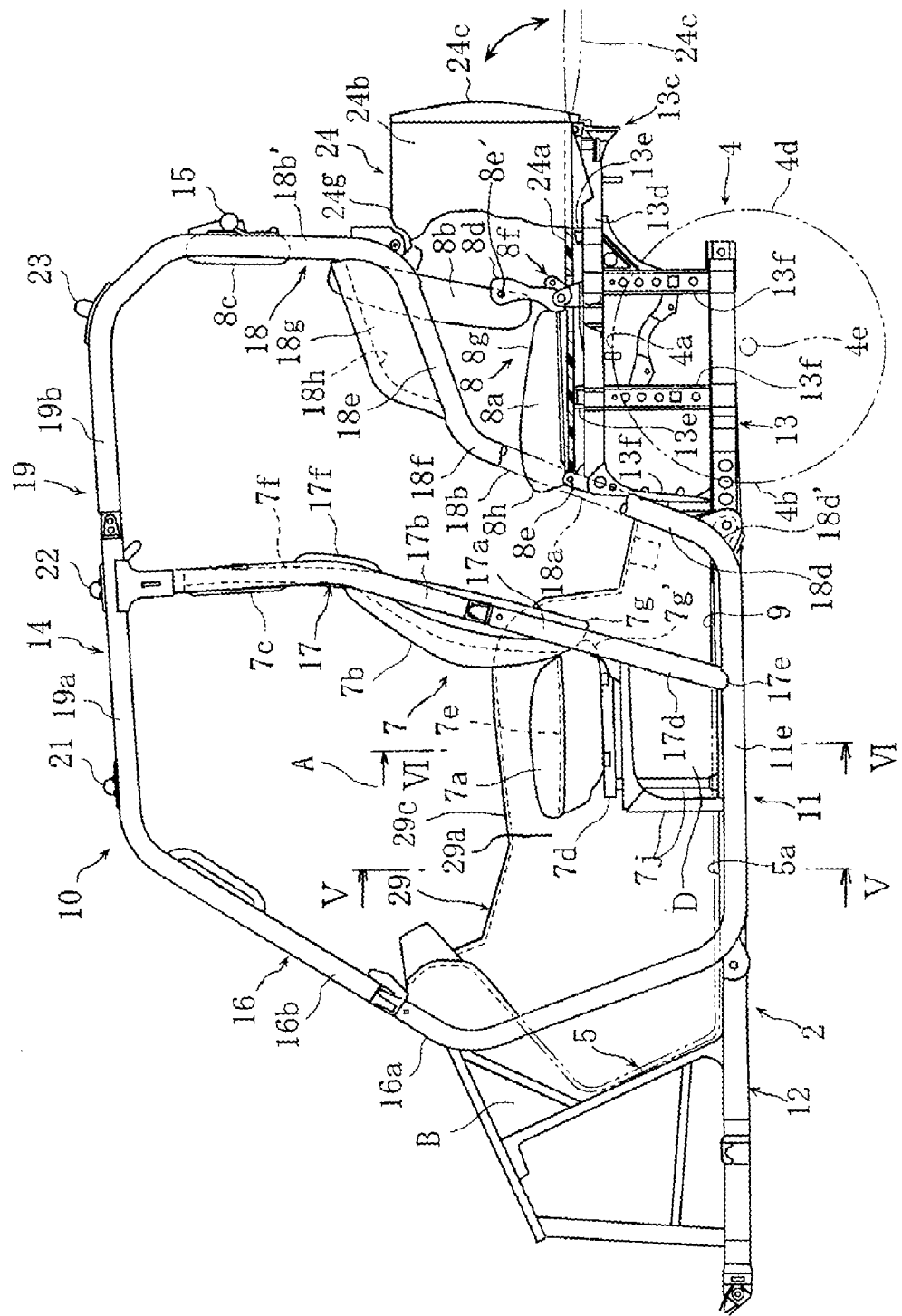
FIG. 3 is a left side view illustrating the vehicle body frame, the roof support, the roof member, and the seats.
Figure 4:
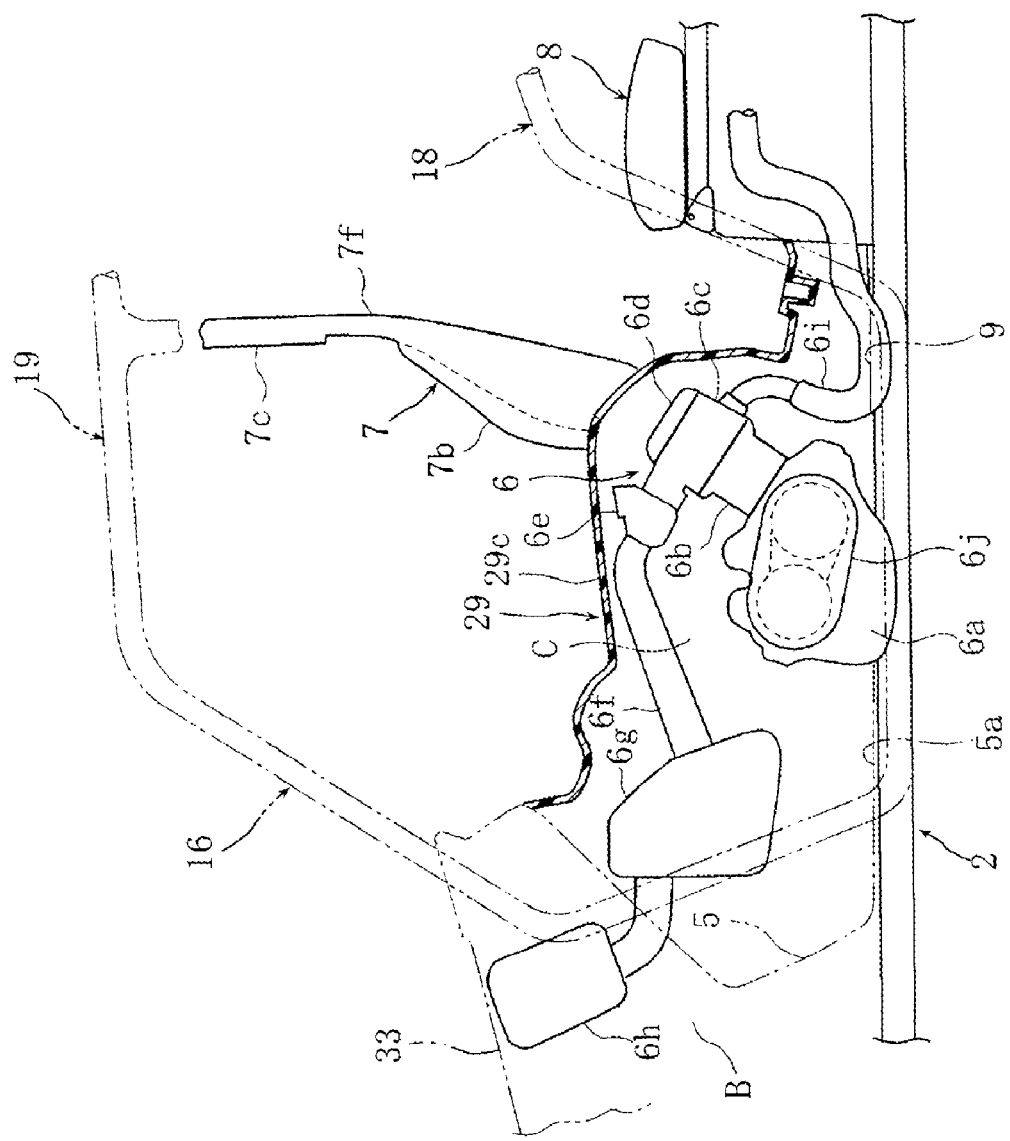
FIG. 4 is a cross-sectional diagram illustrating the relationships between the center console and the engine unit.
Figure 15:
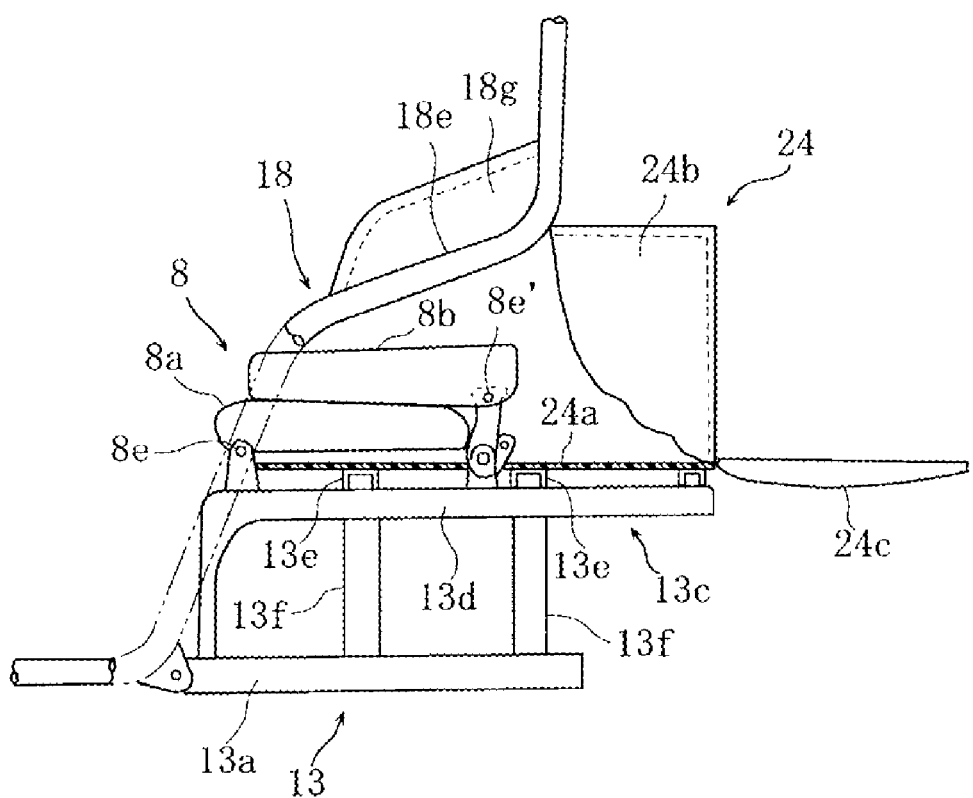
FIG. 15 is a left side view illustrating the rear seat back rest portion when folded to the front.

Additionally, the rear seat 8, as illustrated in FIG. 3, is positioned in an in-use position, wherein passengers are seated over the cargo bed 24, through having the cushion portion locking mechanism 8f and the backrest portion locking mechanism 8f be in the locked state. When the interlock with the locking pin 8m' is released through rotating the locking lever 8k' of the backrest portion locking mechanism 8f to the forward direction of the vehicle, then, as illustrated in FIG. 15, the backrest portion 8b can be rotated in the forward direction so as to lie above the seat cushion portion 8a.

Figure 16:
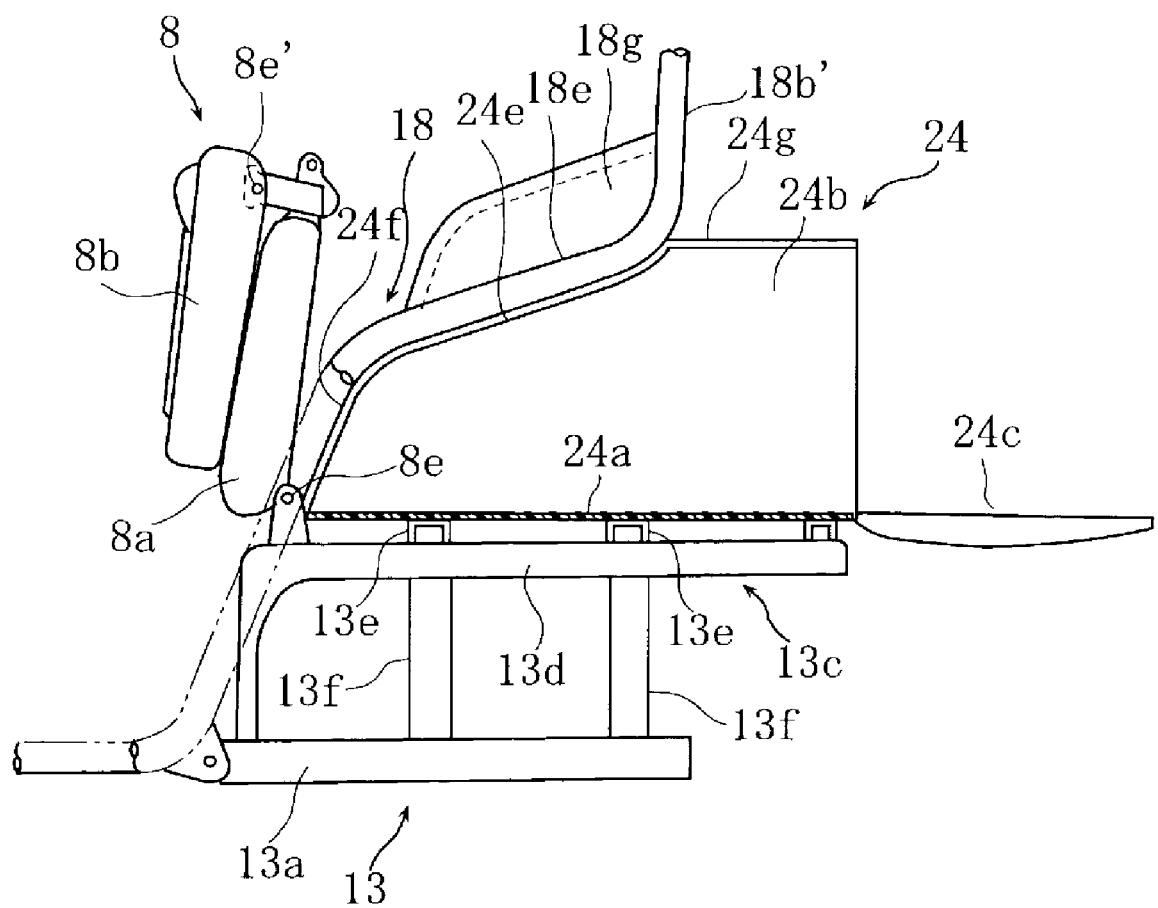
FIG. 16 is a left side view illustrating the rear seat back rest portion and the seat cushion portion when folded and moved to the not-in-use position.

Furthermore, when the interlock with the locking pin 8m is released through rotating the locking lever 8k of the cushion portion locking mechanism 8f to the forward direction of the vehicle, then, as illustrated in FIG. 16, the seat cushion portion 8a can be rotated together with the backrest portion 8b in the forward direction so as to be positioned in the non-in-use position wherein the passengers are not seated.

The cabin structuring member 10 includes a front roof support structure 16, provided on the left and right side portions of the center frame 11; center roof support structure 17; rear roof support structure 18; and a roof member 14 that connects the top portions of the roof support structures 16, 17, and 18. A cabin with a feeling of spaciousness is achieved by this cabin structuring member 10.

The front roof support structure 16 is disposed on the front end portions on the left and right side portions of the center frame 11. The front roof support structure 16 includes pipes that extend upwards extending from the front end portion of the left and right side pipes 11e and 11f. Additionally, the front roof support structure 16 is partitioned into lower portions 16a and upper portions 16b which are connected via bolts 16c that penetrate therethrough in the front/back direction of the vehicle.

The center roof support structure 17 is provided in the center portion at the left and right side portions of the center frame 11, further towards the rear of the utility vehicle 1 than the front roof support structure 16. The center roof support structure is connected to the middle of the left and right side pipes 11e and 11f, and includes pipes extending upward therefrom. The front roof support structure 17 is partitioned into lower portions 17a and upper portions 17b that and are connected via bolts 17c that penetrate therethrough.

The rear roof support structure 18 is disposed at the rear end portion on the left and right side portions of the center frame 11, further towards the rear of the utility vehicle 1 than the center roof support structure 17. The rear roof support structure 18 includes pipes that extend upwards extending from the rear end portion of the left and right side pipes 11e and 11f. The rear roof support structure 18 is partitioned into lower portions 18a and upper portions 18b that are connected by bolts 18c that penetrate therethrough.

The roof member 14 includes left and right side roof pipes 19 and 20, which extend in the front/back direction of the vehicle and which connect together the upper end portions of the front, center, and rear roof structures 16, 17, and 18. The roof member further includes a front cross pipe 21, a center cross pipe 22, and a rear cross roof pipe 23, which extended in the direction of width of the vehicle. Front cross pipe 21 connects together the front end upper portions 16a, second cross pipe 21 connects together center cross portions 17a, and rear cross pipe 23 connects together the rear end portions 18a of the left and right side roof pipes 19 and 20.

The left side roof pipe 19 is partitioned into a forward portion 19a and a rear portion 19b, and is connected by bolts 19c. Similarly, the right side roof pipe 20 is partitioned into a forward portion 20a and a rear portion 20b, and is connected by bolts 20c. The front, center, and rear cross roof pipes 21, 22, and 23 are connected by bolts 21a, 22a, and 23a to the left and right side roof pipes 19 and 20.

In exemplary embodiments, the front roof support structure 16 is formed with bends so as to resemble the "<" signs overall, and, in the vicinities of the bent portions 16d, are partitioned into the upper portions 16b and the lower portions 16a. As a result, the passengers in the rear seat 8 will be seated in positions further towards the center of the vehicle than the passengers in the front seat 7. In addition, the front seats 7 are split into the left and the right, so that a gap W3, wherein the engine unit 6 may be disposed, is opened therebetween. As a result, the passengers seated in the rear seat 8 are able to secure a field of view, in the forward direction of the automobile, between the left and right front seats 7.

Additionally, the center roof support structure 17 is disposed so as to be essentially coincident with the backrest portions 7b of the front seats 7. Furthermore, the downward direction portions 17d of the center roof support structure 17, which are lower than the headrest portions 7c of the front seats 7, are inclined so as to be positioned further forward the further down. Additionally, the lower ends 17e of the center roof support structure 17 is positioned so as to be further forward from the rear end portion 7f of the front seat 7. The lower ends 17e are positioned so as to be further forward than the rear end portions 7g' of the seat cushion portion 7a and the lower end portion 7g of the backrest portion 7b.

Note that while in one exemplary embodiment, the portions of the center roof support structure 17 that are positioned lower than the headrest portions 7c of the front seats 7 are angled as set forth above. It is also contemplated that those portions of the center roof support structure 17 that are positioned lower than at least the seating surface 8g of the seat cushion portion 8a of the rear seat 8 may also be angled. Additionally, the center roof support structure 17 is provided with grip portions 17f that can be grasped by the passengers of the rear seat 8. These grip portions 17f are disposed at positions that are higher than the seating surfaces 7e of the front seat 7, and the seating surface 8g of the rear seat 8.

In addition, the downward direction portions 18d of the rear roof support structure 18, which are positioned lower than the seating surface 8g of the rear seat 8, are inclined backwards so as to be essentially parallel with the downward direction portions 17d of the center roof support structure 17, positioned so as to be further back the higher on the downward direction portions 18d. The upper end portions 18f of the downward direction portions 18d are positioned to the rear of the front end portion 8h of the rear seat 8.

The middle portions 18e, of the rear roof support structure 18, which extend upward from the upper end portions 18f of the downward direction portions 18d, are inclined backwards even more than are the lower portions 18d. Additionally, these middle portions 18e, when viewed from the side of the vehicle, extend towards the rear cutting across the backrest portion 8b of the rear seat 8. Furthermore, the rear end portions 18b', which extend upwards essentially vertically, after the middle portions 18e, are positioned forward in the front/back direction of the vehicle, from the rear end portions 4d of the rear wheels 4.

Additionally, the bar-shaped members 18h are disposed higher than the middle portions 18e, and these bar-shaped members 18h are covered by plastic covers 18g. The covers 18g structure surfaces that are wide in the front/back direction of the vehicle and in the vertical direction.

Additionally, the bar-shaped members 18h are disposed higher than the middle portions 18e, and these bar-shaped members 18h are covered by plastic covers 18g. A portion of the rear support structure 18, specifically, the middle portion 18e, are coincident with a portion of the rear wheels 4, in the front/back direction of the vehicle. That is to say, the middle portion 18e is coincident with a portion of the rear wheels 4, when viewed from above the vehicle. Restating again, the position, in the front/back direction, of the middle portion 18e is essentially coincident with the position of the rear wheels 4 in the front/back direction. Consequently, in exemplary embodiments, not only is the middle portion 18e of the rear roof support structure 18 inclined greatly, but the rear wheels 4 are also positioned below the middle portion 18e, and thus the rear wheels 4 are positioned much further forward than in vehicles having conventional front seats and rear seats.

Here front doors 34 are disposed on the left and right sides, in the direction of width of the vehicle, of the foot space of the front seat 7. Note that 36 is a side cover that is disposed to the side of the front seat 7. Also, rear doors 35 are disposed on the left and right sides, in the direction of width of the vehicle, of the foot space of the rear seat 8.

Additionally, a rear seatbelt device 60 is provided on the rear seat 8, and a front seatbelt device 61 is provided on the front seat 7. The rear seatbelt device 60 includes: a belt main unit 60a; a belt anchor 60b for securing one end of the belt main unit 60a to the vehicle frame; a retractor 60c for winding storably the other end of the belt main unit 60a; a tongue plate 60d that can be attached slidably to the belt main unit 60a; a buckle 60e that can be attached to/removed from the tongue plate 60d; and a support member 60f for supporting the middle portion of the belt main unit 60a.

The belt anchor 60b is attached to an under cross pipe 13g that is disposed at the front end portion of the cargo bed frame 13c. The buckle 60e is attached, by a belt 60k, via a bracket 60j, to a horizontal frame 13e of the cargo bed frame 13c, and can be housed in an indented portion 24g of the side wall portion 24a of the cargo bed 24. Additionally, the support member 60f is formed from an elastic member, and is attached to a bracket 15 a that connects the rear cross pipes 15 and 23.

Furthermore, and adjusting member 60g is attached to and upper portion 18a of a rear roof support 18. This adjusting member 60g is structured from a through hole 60h wherein an opening portion penetrates through the support member 60f and the retractor 60c of aforementioned belt main unit 60a, and a locking slit 60i that can interlock with the portion between the support member 60f of the belt main unit 60a and the tongue plate 60e.

Figure 17:
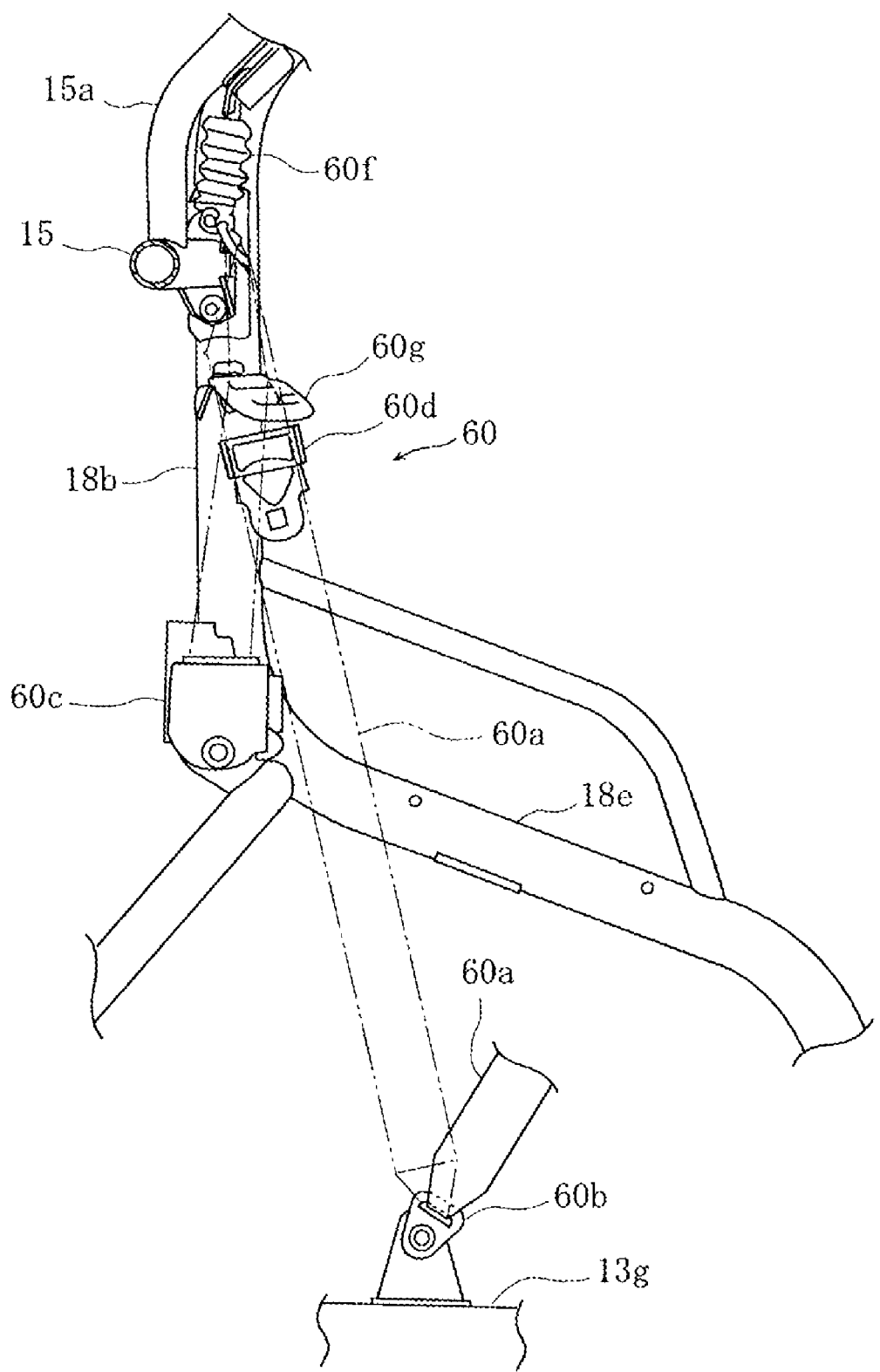
FIG. 17 is a side view diagram illustrating the left rear seatbelt when viewed from the inside of the vehicle.
Figure 18:
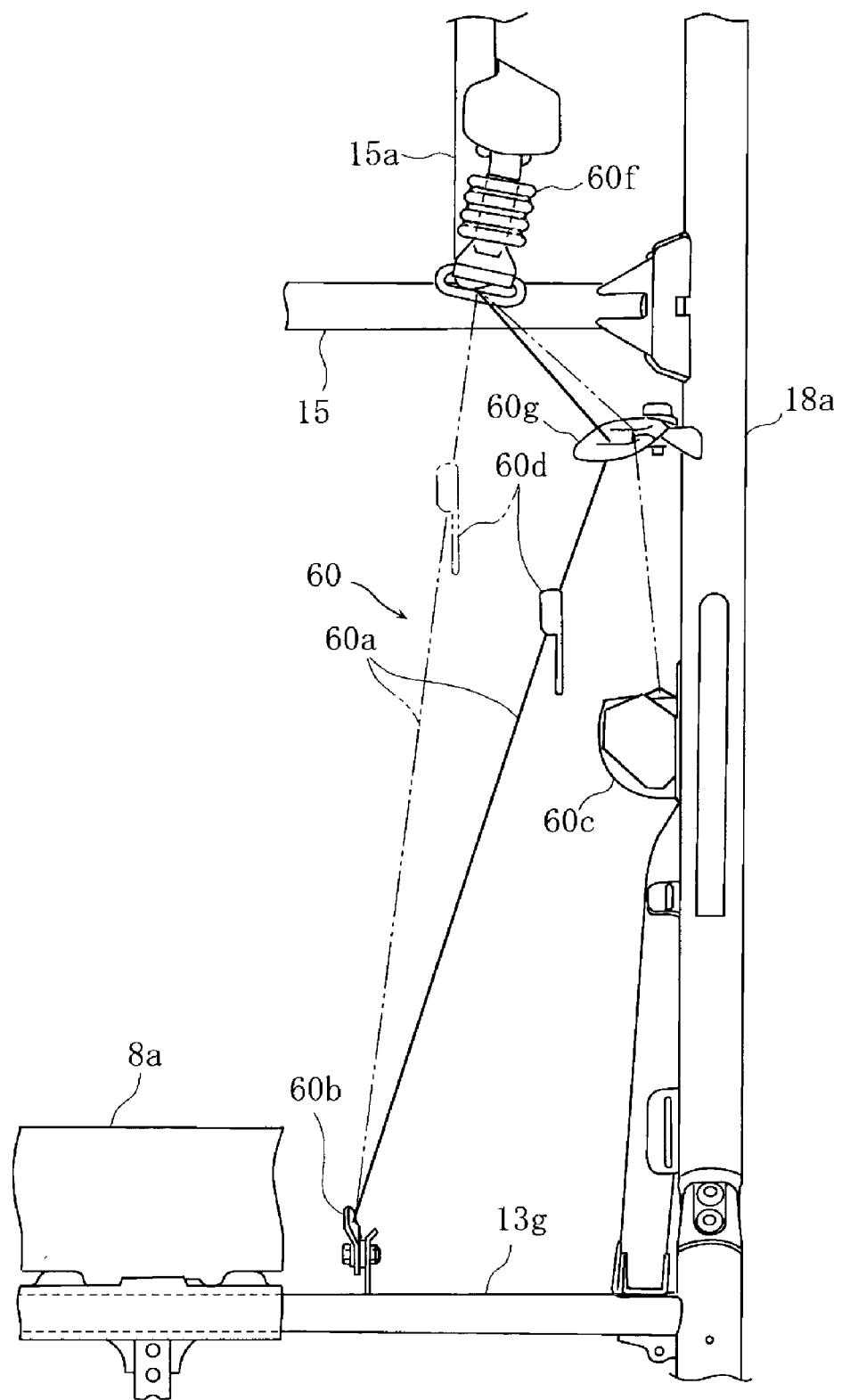
FIG. 18 is a front view of the left rear seatbelt.
Figure 19:
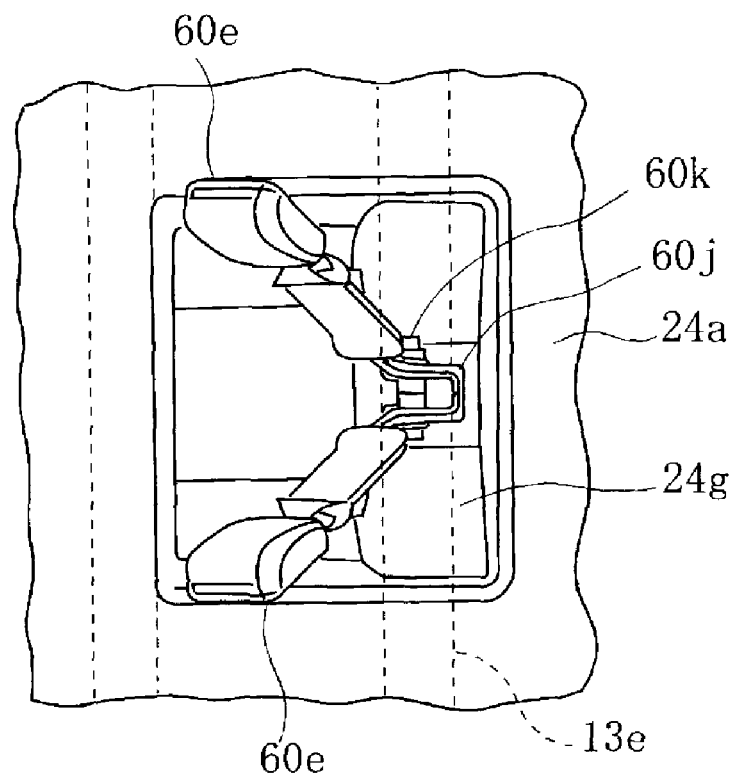
FIG. 19 is a plan view illustrating the state of disposal of the buckle of the rear seatbelt.
Figure 20:
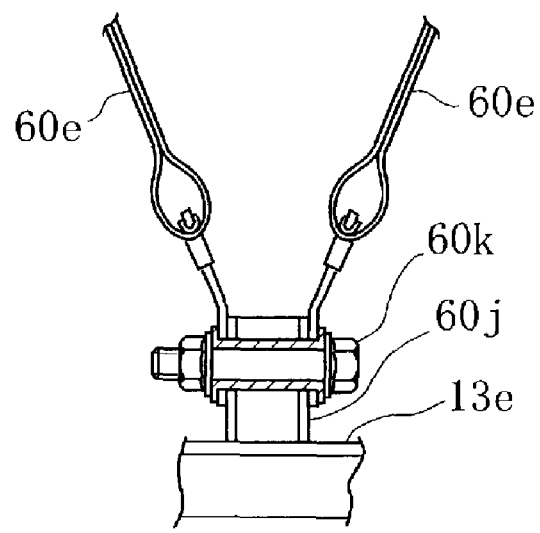
FIG. 20 is a cross-sectional diagram along the section IIX-IIX in FIG. 13, illustrating the buckled state.
Figure 21:
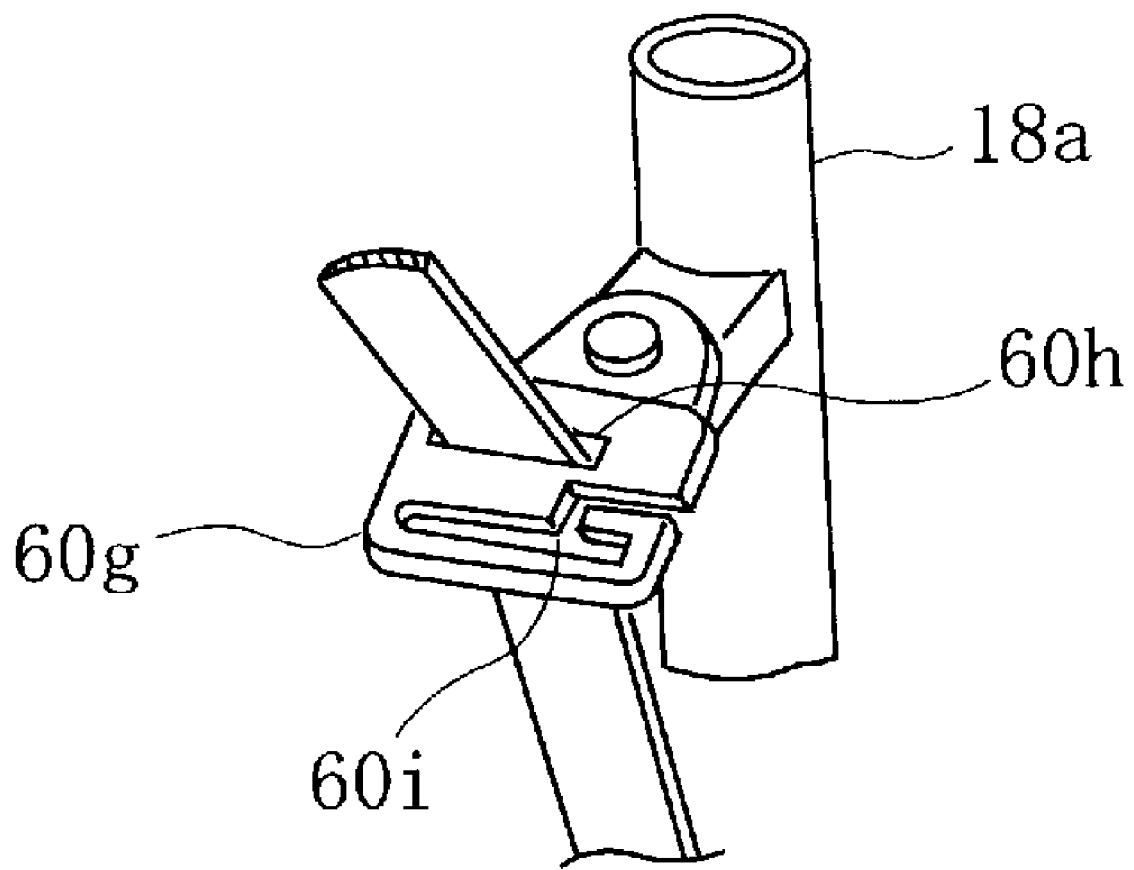
FIG. 21 is an oblique view illustrating an adjusting member.
Figure 22:
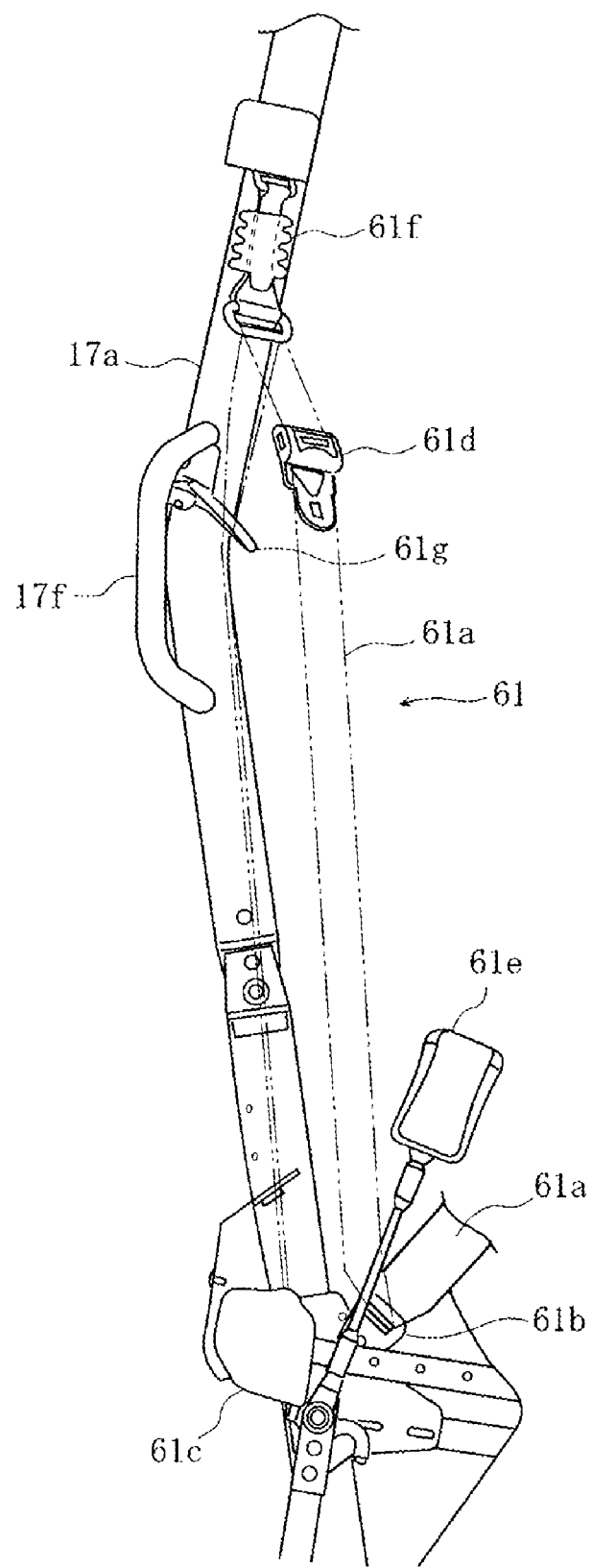
FIG. 22 is a side view diagram illustrating the left front seatbelt when viewed from the inside of the vehicle.

As is illustrated by the solid line in FIG. 18, when the portion between the support member 60f of the belt main unit 60a and the tongue plate 60e interlocks with the locking slit 60i of the adjusting member 60g, the height of the belt main unit 60a, relative to the passenger, will be lower than the non-interlocked case. Note that the dotted lines in FIG. 17 and FIG. 18 illustrate the case wherein the passenger is not using the rear seatbelt device 60.

The front seatbelt device 61 has the generally the same structure as the rear seatbelt device 60, including: a belt main unit 61a; a belt anchor 61b for securing one end of the belt main unit 61a to the vehicle frame; a retractor 61c for winding storably the other end of the belt main unit 61a; a tongue plate 61d that can be attached slidably to the belt main unit 61a; a buckle 61e that can be attached to/removed from the tongue plate 61d; and a support member 61f for supporting the middle portion of the belt main unit 61a. The belt anchor 61b and buckle 61e are attached to a seat bracket 7j of the front seat 7.

The portion of the belt main unit 61a between the support member 61f and the retractor 61c is interlocked with the adjusting member 61g. This adjusting member 61g is secured to and upper portion 17a of a center roof support 17. When the portion between the support member 61f of the belt main unit 61a and the tongue plate 61e interlocks with the adjusting member 61g, the height of the belt main unit 61a, relative to the passenger, will be lower than the non-interlocked case.

In an exemplary embodiment, the seat cushion portion 8a of the rear seat 8 is provided on the bottom wall portion 24a of the cargo bed 24 so as to be able to move between and in-use position, wherein passengers are seated, and a not-in-use position, wherein passengers are not seated, and the left and right side wall portions 24b of the cargo bed 24 are disposed so as to be coincident, in the front/back direction of the vehicle, with a portion of the second roof supports 18 and the rear seat 8, thus enabling the cargo bed space to be expanded and making the structure and operation of expanding the cargo space extremely simple, completed by merely moving the rear seat 8 to the non-in-use position. Additionally, the backrest portion 8b of the rear seat 8 is rotated forward, and the seat cushion portion 8a is rotated forward, enabling the space of the cargo bed 24 wherein the rear seat 8 is disposed to be expanded as cargo bed space.

In addition, the top edges 24e and the front edges 24f of the left and right side wall portions 24b of the cargo bed 24 are formed in positions that are lower the further forward, making it possible for the left and right side wall portions 24b to encompass the rear seat 8 while avoiding a negative impact on the ease of ingress/egress of the rear seat passengers. In this case, the top edges 24e and front edges 24f are formed following along the middle portions 18e of the rear roof supports 18, enabling a sophisticated external appearance for the cargo bed 24 while avoiding even more reliably any negative impact on the ease of ingress/egress of the rear seat passengers, while still extending, in the forward direction, the left and right side wall portions 24b.

In addition, the top edges 24e of the left and right side wall portions 24b of the cargo bed 24 are formed in positions that are lower than the top edge 8b' of the backrest portion 8b of the rear seat 8, making it possible for the left and right side wall portions 24b to encompass the rear seat 8 while securing a feeling of spaciousness and the ease of ingress/egress of the rear seat passengers.

In addition, the top of the left and right side wall portions 24b of the cargo bed 24 is positioned to the rear, and the front/back direction of the vehicle, from the front end 8a' of the seat cushion portion 8a of the rear seat 8, making it possible for the left and right side wall portions 24b to encompass the rear seat 8 while not having a negative impact on the ease of ingress/egress of the rear seat passengers.

The headrest portion 8c of the rear seat 8 is a separate unit from the backrest portion 8b, and is attached to the rear cross pipe 15 that is connected to the left and right rear roof supports 18, simplifying the structure and the operation when folding the rear seat 8 between the in-use position and the not-in-use position. That is, if the headrest portion were connected to the backrest portion, there would be the need for structures and operations whereby to remove the headrest portion when folding the rear seat.

Furthermore, the rear wheels 4 are disposed below the rear seat 8, and the front end 24h of the cargo bed 24 is positioned forward of the front end 4b of the rear wheels 4, making it possible to increase the cargo space while decreasing the length of the vehicle.

Furthermore, the cargo bed 24 may be made out of plastic, not only enabling a great degree of freedom in the shape thereof, but also enabling reduction in weight.

The front end portion 8a' of the seat cushion portion 8a of the rear seat 8 is supported by the cargo bed frame 13c whereon the bottom wall portion 24a of the cargo bed 24 is supported, enabling an increase in the strength of the support of the rear seat 8. The backrest portion 8b of the rear seat 8 is supported on the seat cushion portion 8a, via a bracket 8d, so as to be able to rotate forward, enabling the rear seat 8 to be moved to a not-in-use position through rotating the backrest portion 8b in the forward direction and rotating the seat cushion portion 8a in the forward direction.

Note that while the description of the above embodiments was for a case wherein the rear seat 8 was able to rotate or fold between an in-use position and a not-in-use position, when, the rear seat can formed so as to be able to be movable, it may also be attachable/removable. In this case, the state of attachment over the cargo bed is positioned at the in-use position, and the state of removal is positioned at the non-in-use position.

Furthermore, while the description of the above embodiments was for the case of a four-wheeled vehicle provided with a pair of left and right front wheels and a pair of left and right rear wheels, the present invention is not limited by the number of wheels of the vehicle, but can also be applied, for example, to the case of a six-wheeled vehicle provided with, for example, two pairs of left and right rear wheels.

Additionally, while the description of the above embodiments a case was explained front roof supports, center roof supports, and rear supports were provided, the present invention can also be applied to a vehicle wherein center roof supports are not provided.

What is claimed is:

1. A utility vehicle comprising:
   a vehicle body frame;
   a pair of left and right front wheels and at least a pair of left and right rear wheels supported on the vehicle frame;
   a front seat provided to the rear of the front wheels;
   a rear seat provided to the rear of the front seat and including an in-use position, a transition position, and a non-use position;
   a cargo bed, disposed to the rear of the front seat, and comprising:
      a bottom wall portion whereon a seat cushion portion of the rear seat is movably provided;
      a left side wall portion and a right side wall portion provided on left and right side portions of the bottom wall portion, wherein the left side wall portion and the right side wall portion extend forward to and along outer sides of the rear seat in a width direction of the vehicle when the rear seat is in the in-use position and in the non-use position; and
      a rear wall portion provided at a rear end portion of the bottom wall portion; and
   a rear floor provided between the front seat and the rear seat and lower than the bottom wall portion of the cargo bed.

2. The utility vehicle as set forth in claim 1, wherein a front end portion of a top edge of the left side wall portion and a front end portion of a top edge of the right side wall portion of the cargo bed are arranged at positions that are lower than a back end portion of the left side wall portion and a back end portion of the right side wall portion.

3. The utility vehicle as set forth in claim 2, wherein the top edges of the left side wall portion and the right side wall portion of the cargo bed are arranged lower than a top edge of a back rest portion of the rear seat.

4. The utility vehicle as set forth in claim 2, wherein the top edges of the left side wall portion and the right side wall portion of the cargo bed are arranged in positions that are disposed to the rear of a front end of the seat cushion of the rear seat.

5. The utility vehicle as set forth in claim 1, wherein at least a portion of a rear wheel is disposed under the rear seat, and a front end of the cargo bed is disposed forward from a front end of the rear wheel.

6. The utility vehicle as set forth in claim 1, wherein the cargo bed is made out of plastic.

7. The utility vehicle as set forth in claim 1, wherein a front end portion of the seat cushion portion of the rear seat is supported on a frame member, which supports the bottom wall portion of the cargo bed, so as to be rotatable in the forward direction around a rotational axle that extends in the width-wise direction of the vehicle.

8. The utility vehicle as set forth in claim 7, wherein a backrest portion of the rear seat is supported, on the seat cushion portion, so as to be able to rotate in the forward direction of a front/back direction of the vehicle.

9. The utility vehicle as set forth in claim 8, wherein a capacity of the cargo bed where the rear seat is disposed in the in-use position can be expanded, as cargo bed space, by rotating the backrest portion forward and rotating the seat cushion portion forward.

10. A utiltity vehicle comprising:
    a vehicle body frame;
    a front roof support including a pair of left and right pipe members that extend in a vertical direction, provided at both left and right side portions of the vehicle body frame;
    a pair of left and right rear roof supports including pipe members arranged to extend in the vertical direction, provided to the rear of the front roof support at both the left and right side portions of the vehicle body frame in a width-wise direction of the vehicle;
    a roof member arranged to connect top portions of the front roof supports and top portions of the rear roof supports;
    a pair of left and right front wheels and at least a pair of left and right rear wheels supported on the vehicle frame;
    a front seat provided to the rear of the front wheels;
    a rear seat provided to the rear of the front seat and including an in-use position, a transition position, and a non-use position;

a cargo bed, disposed to the rear of the front seat, and comprising:
- a bottom wall portion whereon a seat cushion portion of the rear seat is movably provided;
- a left side wall portion and a right side wall portion provided on left and right side portions of the bottom wall portion and arranged to extend forward to the left and right rear roof supports, respectively, when the rear seat is in the in-use position and in the non-use position; and
- a rear wall portion provided at a rear end portion of the bottom wall portion; and
- a rear floor provided between the front seat and the rear seat and arranged lower than the bottom wall portion of the cargo bed.

11. The utility vehicle as set forth in claim 10, wherein a left rear headrest and a right rear headrest portion of the rear seat are provided on a cross member that connects to the left and right rear roof supports.

12. The utility vehicle as set forth in claim 10, wherein at least a portion of a top edge of the left side wall portion and a top edge of the right side wall portion of the cargo bed is arranged along the rear roof supports.

13. The utility vehicle as set forth in claim 10, wherein a front end portion of the seat cushion portion of the rear seat is supported on a frame member, which supports the bottom wall portion of the cargo bed, so as to be rotatable in the forward direction around a rotational axle that extends in the width direction of the vehicle.

14. The utility vehicle as set forth in claim 13, wherein a backrest portion of the rear seat is supported, on the seat cushion portion, so as to be able to rotate in the forward direction of a front/back direction of the vehicle.

15. The utility vehicle as set forth in claim 14, wherein a capacity of the cargo bed where the rear seat is disposed in the in-use position arranged to be expanded, as cargo bed space, by rotating the backrest portion forward and rotating the seat cushion portion forward.

* * * * *